(12) United States Patent
Mäkinen et al.

(10) Patent No.: US 11,101,745 B2
(45) Date of Patent: Aug. 24, 2021

(54) ELECTROSTATIC ACTUATOR

(71) Applicant: PixArt Imaging Inc., Hsin-Chu (TW)

(72) Inventors: Ville Mäkinen, Espoo (FI); Roberto Tejera-Garcia, Espoo (FI); Aki Salminen, Espoo (FI)

(73) Assignee: Pix Art Imaging Inc., Hsin-Chu (TW)

( * ) Notice: Subject to any disclaimer, the term of this patent is extended or adjusted under 35 U.S.C. 154(b) by 516 days.

(21) Appl. No.: 15/852,386

(22) Filed: Dec. 22, 2017

(65) Prior Publication Data

US 2019/0020288 A1   Jan. 17, 2019

(30) Foreign Application Priority Data

Jul. 14, 2017 (FI) ...................................... 20175691

(51) Int. Cl.
*H02N 1/00* (2006.01)
*G06F 3/01* (2006.01)
*H01H 59/00* (2006.01)
*H02N 1/08* (2006.01)

(52) U.S. Cl.
CPC ............. *H02N 1/004* (2013.01); *G06F 3/016* (2013.01); *H01H 59/0009* (2013.01); *H02N 1/08* (2013.01)

(58) Field of Classification Search
CPC ...... H02N 1/004; H02N 1/08; H01H 59/0009; G06F 3/016; B81B 3/0056; B81B 3/0021
USPC ................................................. 310/310, 309
See application file for complete search history.

(56) References Cited

U.S. PATENT DOCUMENTS 5,434,464 A   7/1995 Bobbio et al.
6,329,738 B1  12/2001 Hung et al.
6,359,757 B1   3/2002 Mallary
2004/0058469 A1   3/2004 Kowarz
2006/0105152 A1*  5/2006 Cok ........................ G06F 3/045
                                                           428/209

(Continued)

FOREIGN PATENT DOCUMENTS

EP      1332547    3/2006
JP      H0628750   2/1994

(Continued)

OTHER PUBLICATIONS

"International Application Serial No. PCT FI2018 050543, International Preliminary Report on Patentability dated Oct. 7, 2019", 7 pgs.

(Continued)

*Primary Examiner* — Ahmed Elnakib
(74) *Attorney, Agent, or Firm* — Winston Hsu

(57) ABSTRACT

An actuator is configured to include a first substrate that has a first conductive surface, which may be or include a first conductive electrode layer. The actuator also includes a second substrate that has a second conductive surface, which may be or include a second conductive electrode layer. The first and second conductive surfaces face toward each other across a compression space between the first and second substrates. A group of elastic support nodules span the compression space and separate the first and second conductive surfaces. The compression space is less than fully filled with solid elastic material and is configured to be compressed by relative movement of the first and second conductive surfaces toward each other in response to a voltage difference between the first and second conductive surfaces.

32 Claims, 12 Drawing Sheets

(56) References Cited

U.S. PATENT DOCUMENTS

| | | | |
|---|---|---|---|
| 2006/0170925 A1* | 8/2006 | Lin | G01N 21/553 356/445 |
| 2011/0096013 A1 | 4/2011 | Krumpelman et al. | |
| 2012/0306790 A1 | 12/2012 | Kyung et al. | |
| 2013/0075237 A1 | 3/2013 | Gutierrez | |
| 2013/0249859 A1 | 9/2013 | Park et al. | |
| 2014/0092110 A1 | 4/2014 | Chan et al. | |
| 2014/0338458 A1* | 11/2014 | Wang | G01H 11/06 73/658 |
| 2015/0112793 A1 | 4/2015 | Collier | |
| 2015/0277097 A1 | 10/2015 | Hong et al. | |
| 2015/0326146 A1 | 11/2015 | Huang | |

FOREIGN PATENT DOCUMENTS

| | | |
|---|---|---|
| JP | H06284750 | 10/1994 |
| JP | H08168099 | 6/1996 |
| JP | 2007259663 | 10/2007 |
| JP | 5674222 | 1/2015 |
| KR | 20150112793 | * 10/2015 |
| WO | 2009048952 | 4/2009 |
| WO | 2018172621 | 9/2018 |
| WO | 2018172622 | 9/2018 |
| WO | 2018172623 | 9/2018 |

OTHER PUBLICATIONS

"International Application Serial No. PCT FI2018 050544, International Preliminary Report on Patentability dated Sep. 30, 2019", 7 pgs.

"International Application Serial No. PCT FI2018 050542, International Preliminary Report on Patentability dated Sep. 30, 2019", 8 pgs.

"Finland Application Serial No. 20175691, Office Action dated Feb. 15, 2018", in English, 9 pgs.

"Finland Application Serial No. 20175691, Response filed Aug. 15, 2018 to Office Action dated Feb. 15, 2018", 15 pgs.

"International Application Serial No. PCT FI2018 050543, International Search Report dated Oct. 30, 2018", 4 pgs.

"International Application Serial No. PCT FI2018 050543, Written Opinion dated Oct. 30, 2018", 8 pgs.

"International Application Serial No. PCT FI2018 050543, Demand for International Preliminary Examination filed May 14, 2019", 11 pgs.

"International Application Serial No. PCT FI2018 050544, Demand for International Preliminary Examination dated May 14, 2019", 17 pgs.

"International Application Serial No. PCT FI2018 050544, International Search Report dated Nov. 7, 2018", 6 pgs.

"International Application Serial No. PCT FI2018 050544, Written Opinion dated Nov. 7, 2019", 11 pgs.

"International Application Serial No. PCT FI2018 050542, Demand for International Preliminary Examination dated May 14, 2019", 16 pgs.

"International Application Serial No. PCT FI2018 050542, International Search Report dated Oct. 22, 2018", 4 pgs.

"International Application Serial No. PCT FI2018 050542, Written Opinion dated Oct. 22, 2019", 8 pgs.

"Finland Application Serial No. 20175691, Office Action dated Jan. 10, 2019", w English Translation, 2 pgs.

"Finland Application Serial No. 20175691, Response Filed Jan. 16, 2019 to Office Action dated Jan. 10, 2019", w o English claims, 19 pgs.

"Finland Application Serial No. 20175691, Office Action dated Mar. 30, 2020", 8 pgs.

* cited by examiner

1000

1000

ELECTROSTATIC ACTUATOR

RELATED APPLICATION

This application claims the priority benefit of Finnish Patent Application No. 20175691, filed Jul. 14, 2017, and titled "ELECTOSTATIC ACTUATOR STRUCTURE," which application is incorporated herein by reference in its entirety.

TECHNICAL FIELD

The subject matter disclosed herein generally relates to an arrangement for facilitating a surface actuation mechanism in devices (e.g., systems or other apparatus) with a surface structure configured to facilitate electrically induced mechanical movement, including devices configured to provide (e.g., via such electrically induced mechanical movement) various tactile effects, such as tactile feedback. Specifically, the present disclosure addresses an electrostatic actuator for devices (e.g., systems or other apparatus) that have a surface structure configured to facilitate electrically induced mechanical movement.

BACKGROUND

There are various techniques for facilitating electrically induced mechanical movement in devices (e.g., consumer electronic devices). One common technique is the use of an Eccentric Rotating Mass (ERM) vibration motor. An ERM vibration motor moves a small rotating mass that is off-center from the point of rotation. The rotation of the mass produces a centripetal force, thereby causing the entire motor to move and vibrate from side to side. Another common technique for facilitating electrically induced mechanical movement is the use of a linear resonant actuator (LRA). An LRA uses magnetic fields and electrical current to create a force on a coil, with the coil driving a magnetic mass up and down against a spring. The movement of the magnetic mass inside a housing moves the entire LRA, thus producing electrically induced mechanical movement. Another common technique is the use of a piezoelectric actuator. A piezoelectric actuator produces a mechanical change (e.g., deformation) in a piezoelectric material in response to an applied electric charge, and the mechanical change produces electrically induced mechanical movement.

These techniques for electrically induced mechanical movement are often characterized by high power consumption; low durability; short lifespan; complex design with external motors, masses, or both; low scalability, especially on flexible surfaces; poor suitability to large area actuation; or any combination thereof.

BRIEF DESCRIPTION OF THE DRAWINGS

Some embodiments are illustrated by way of example and not limitation in the figures of the accompanying drawings.

DETAILED DESCRIPTION

Figure 1:
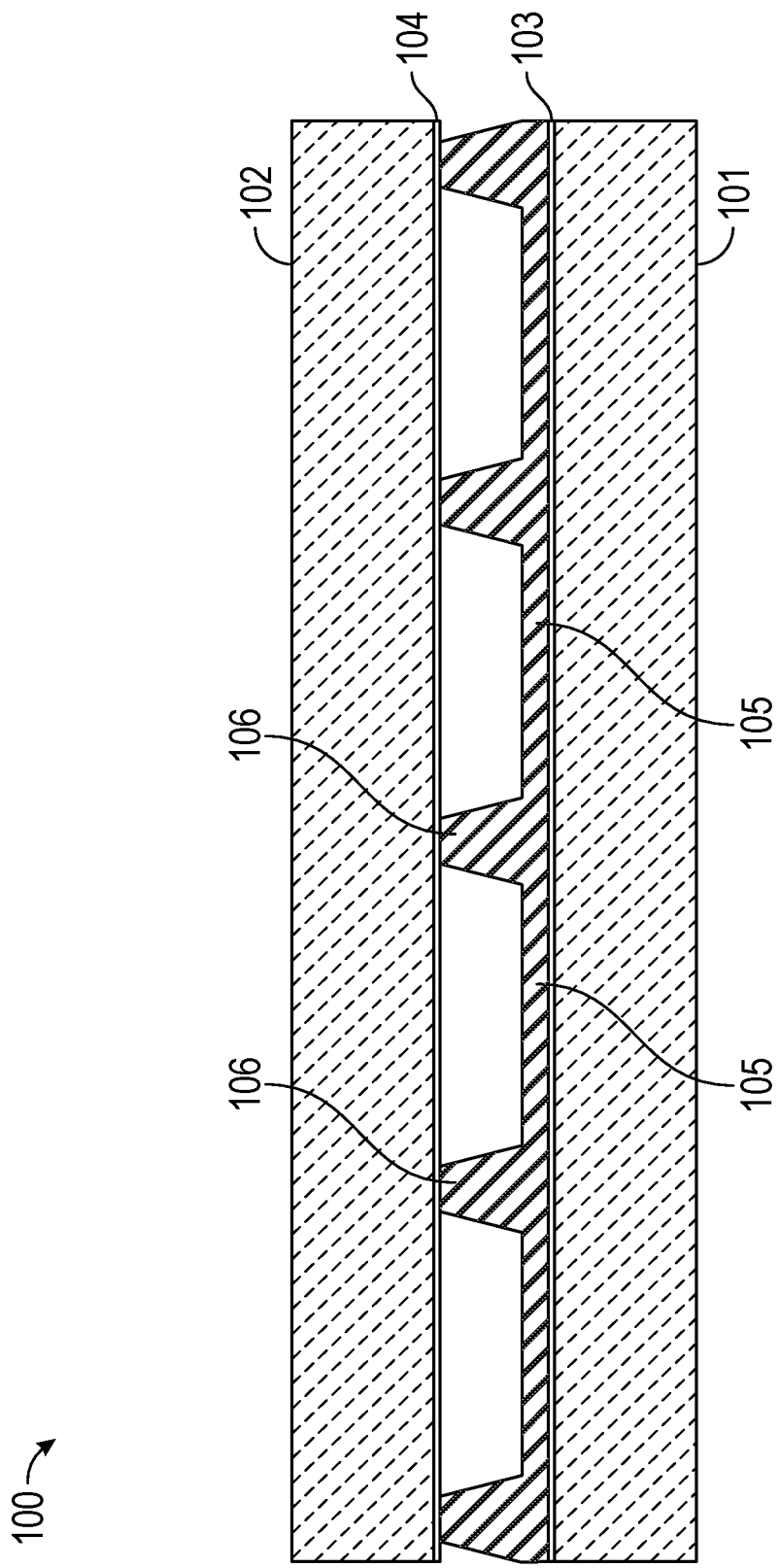
FIG. 1 is a cross-sectional diagram illustrating at least a portion of a single layer of an electrostatic actuator (e.g., an electrostatic actuator structure), according to some example embodiments.

Example structures (e.g., devices, systems, or other apparatus) described herein facilitate electrically induced mechanical movement, which may accordingly provide one or more tactile effects (e.g., tactile feedback). Examples merely typify possible variations. Unless explicitly stated otherwise, structures (e.g., structural components, such as layers or nodules) are optional and may be combined or subdivided, and operations are optional and may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Various example embodiments of the structures discussed herein may be or include a special electrostatic actuator (e.g., electrostatic actuator structure) that includes at least a first electrode and a second electrode. The electrostatic actuator also includes one or more electrostatic actuation layers, and at least one of said electrostatic actuation layers includes:

a first substrate film, which is intrinsically conductive or semiconductive, or includes a first conductive electrode layer, the first conductive electrode layer being a part of the first electrode, a second substrate film, which is intrinsically conductive or semiconductive, or includes a second conductive electrode layer, the second conductive electrode layer being a part of the second electrode, at least one of the first and second conductive electrode layers being insulated (e.g., electrically) from the respective first and second substrate films, and a grid array that includes a plurality (e.g., multitude) of elastic support nodules, the plurality of elastic support nodules being configured (e.g., arranged) between the first substrate film and the second substrate film, such that there is a compression space between the first and second conductive electrode layers, the compression space being not entirely filled with solid material; and wherein the electrostatic actuator is configured to compress (e.g., by a certain percentage or by a certain distance) in response to a voltage difference between the first and second electrodes (e.g., in response to the voltage difference exceeding or otherwise transgressing a threshold voltage difference, such that the electrostatic actuator compresses by a certain percentage or by certain distance when a sufficient voltage difference is applied between at least the first electrode and the second electrode).

Accordingly, the electrostatic actuator may be or include an actuator that comprises:

a first substrate having a first conductive surface (e.g., functioning as a first electrode);

a second substrate having a second conductive surface (e.g., functioning as a second electrode), the first and second conductive surfaces facing toward each other across a compression space between the first and second substrates; and a plurality of elastic nodules spanning the compression space and separating the first and second conductive surfaces, the compression space being less than fully filled with solid (e.g., elastic) material, the compression space being configured to compress (e.g., by certain percentage or by a certain distance) in response to a voltage difference between the first conductive surface and the second conductive surface (e.g., in response to the voltage difference exceeding or otherwise transgressing a threshold voltage difference).

FIG. 1 is a cross-sectional diagram illustrating at least a portion of a single electrostatic actuation layer 100 of an electrostatic actuator (e.g., an electrostatic actuator structure), according to some example embodiments. The electrostatic actuation layer 100 illustrated in FIG. 1 includes a first substrate 101 (e.g., a first substrate film) and a second substrate 102 (e.g., a second substrate film). In the example embodiments shown in FIG. 1, the first substrate 101 and the second substrate 102 each may have a thickness of 100 micrometers (100 μm). The first substrate 101 may include electrically insulating material or be intrinsically conductive or semiconductive, according to various example embodiments. In the example embodiments shown in FIG. 1, the first substrate 101 is a film that includes or otherwise provides a first conductive layer 103 (e.g., a first conductive electrode layer) applied on top of the first substrate 101. The first conductive layer 103 may form all or part of a first electrode. Accordingly, the first substrate 101 can be described as having a first conductive surface, whether the first conductive surface is intrinsically conductive, intrinsically semiconductive, or intrinsically insulative but topped with the first conductive layer 103.

Similarly, as shown in FIG. 1, the second substrate 102 is a film that includes or otherwise provides a second conductive layer 104 (e.g., a second conductive electrode layer) applied on top of the second substrate 102. The second conductive layer 104 may form all or part of a second electrode. Accordingly, the second substrate 102 can be described as having a second conductive surface, whether the second conductive surface is intrinsically conductive, intrinsically semiconductive, or intrinsically insulative but topped with the second conductive layer 104. According to various example embodiments, the first conductive layer 103, the second conductive layer 104, or both, are insulated.

The first substrate 101 (e.g., with the insulated first conductive layer 103) has a layer of electrically insulating elastomer material 105 (e.g., an electrically insulating elastomer coating) applied on top of the insulated first conductive layer 103 of the first substrate 101. Furthermore, there is a group (e.g., plurality or multitude) of elastic support nodules 106 arranged (e.g., in a grid array) and adhered on top of, or forming part of, the intrinsic structure of the layer of electrically insulating elastomer material 105. In the example embodiments shown in FIG. 1, the layer of electrically insulating elastomer material 105 may have a thickness of 20 micrometers (20 μm). Furthermore, according to certain example embodiments, the elastic support nodules 106 each have a height of 60 micrometers (60 μm) and a diameter of 60 micrometers (60 μm). In addition, according to some example embodiments, the elastic support nodules 106 each have an aspect ratio of height to maximum width, and the aspect ratio may have a maximum value of two (2).

Figure 2:
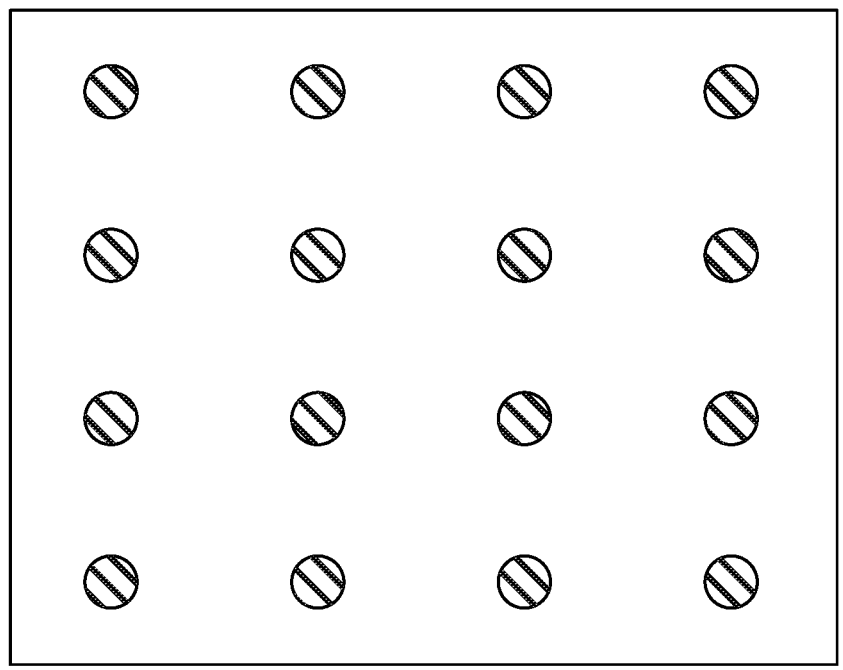
FIG. 2 is a plan view diagram illustrating a multitude of elastic support nodules, arranged in a spaced two-dimensional row-column grid array, according to some example embodiments.
Figure 3:
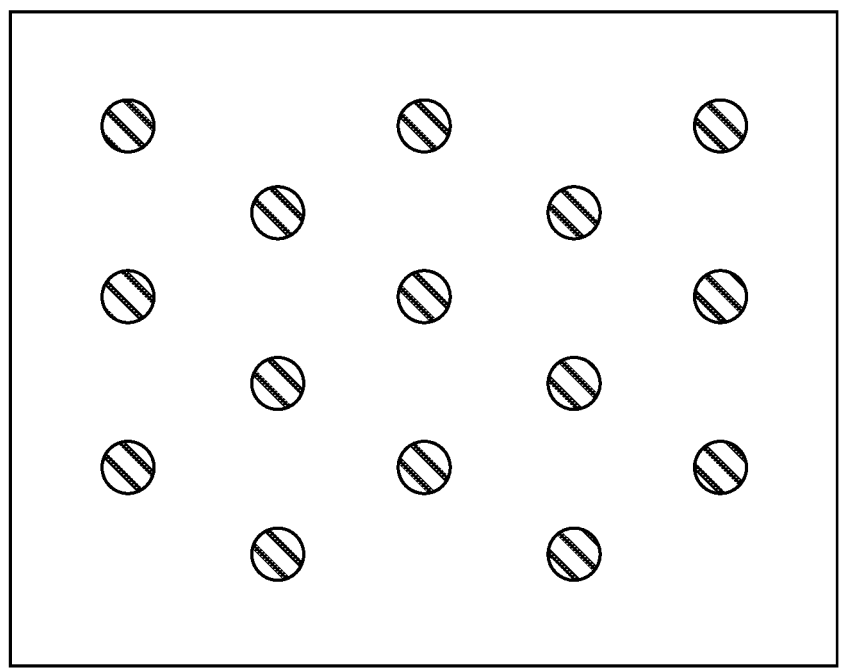
FIG. 3 is a plan view diagram illustrating a multitude of elastic support nodules, arranged in a spaced triangular grid array, according to some example embodiments.

The layer of electrically insulating elastomer material 105, the group of elastic support nodules 106, or both may be applied using a suitable microfabrication technique (e.g. a deposition technique, such as a thin film deposition technique). The group of elastic support nodules 106 may be fully or partially made of a silicon-based organic polymer (e.g., polydimethylsiloxane (PDMS)), rubber (e.g., natural or synthetic), or any suitable combination thereof. Furthermore, the group of elastic support nodules 106 may be arranged less than 10 millimeters (10 mm) apart from each other in distance, and in some example embodiments, the inter-nodule distance is less than 2 millimeters (2 mm). In certain example embodiments, the group of elastic support nodules 106 is arranged in a grid array, such as a spaced two-dimensional row-column grid array, as illustrated in FIG. 2. In some alternative example embodiments, the group of elastic support nodules 106 is arranged in a spaced triangular grid array, as illustrated in FIG. 3.

After the group of elastic support nodules 106 has been applied to the first substrate 101, the second substrate 102 with the second conductive layer 104 may be turned upside down and placed on top of the group of elastic support nodules 106 to form the electrostatic actuation layer 100 (e.g., a single electrostatic actuation layer that may be combined with one or more additional electrostatic actuation layers into a multi-layer electrostatic actuator structure). Before the second substrate 102 is placed on top of the group of elastic support nodules 106, there may be a layer of adhesive applied to the second substrate 102, to the group of elastic support nodules 106, or to both.

As the first substrate 101 and the second substrate 102 have been stacked one above the other (e.g., to form the electrostatic actuation layer 100), the distance between the first conductive layer 103 and the second conductive layer 104, which may be the distance between the first and second electrodes, in the electrostatic actuation layer 100 may be less than 1000 micrometers (1000 µm) and, in some example embodiments, less than 200 micrometers (200 µm). In the electrostatic actuation layer 100 shown in FIG. 1, the distance between the first and second conductive layers 103 and 104 may be 80 micrometers (80 µm).

In the electrostatic actuation layer 100, the group of elastic support nodules 106 provides a compression space between the first and second conductive layers 103 and 104. In many example embodiments, the compression space is not entirely filled with solid material (e.g., the compression space is less than fully filled with solid material, such as solid elastic material). In the example embodiments shown in FIG. 1, the compression space may be 80 micrometers (80 µm) thick, and the layer of electrically insulating elastomer material 105 may be 20 micrometers (20 µm) thick, thus leaving a space gap of 60 micrometers (60 µm). This space gap in the compression space may be filled with fluid (e.g., air, nitrogen, or a dielectric liquid, such as dielectric hydraulic fluid) in places where the elastic support nodules 106 are not present.

In the example embodiments shown in FIG. 1, the electrostatic actuation layer 100 (e.g., one of multiple electrostatic actuation layers within the electrostatic actuator) may also include a group of limiting nodules, which may be arranged in a grid array (e.g., similar to the row-column grid array illustrated in FIG. 2 or the triangular grid array illustrated in FIG. 3). This group of limiting nodules may be arranged between or among the elastic support nodules 106 and between the first substrate 101 and the second substrate 102, for limiting the compression of the compression space and thereby limiting the compression of the electrostatic actuation layer 100 overall. In the example embodiments shown in FIG. 1, the conductive surfaces of the first and second conductive layers 103 and 104 on both sides of the space gap, the elastic support nodules 106, or both may be inherently hydrophobic, hydrophobically or superhydrophobically coated, hydrophobically or superhydrophobically treated, or any suitable combination thereof.

The electrostatic actuation layer 100 is configured (e.g., arranged) to compress when a sufficient voltage difference is applied between at least the first conductive layer 103 (e.g., functioning as a first electrode) and the second conductive layer 104 (e.g., functioning as a second electrode). Hence, an electrostatic actuator (e.g., an electrostatic actuator structure) that includes one or more electrostatic actuation layers (e.g., electrostatic actuation layer 100) may be configured to compress in response to such a voltage difference between the first conductive layer 103 and the second conductive layer 104 (e.g., between respectively first and second conductive surfaces thereof) exceeding a threshold voltage difference (e.g., a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g., embedded) as part of a flexible or elastic substrate. For example, the electrostatic actuator itself may be intrinsically flexible, elastic, or both, and may be included in such a flexible or elastic substrate. The electrostatic actuation layer 100 shown in FIG. 1 may have an overall thickness in the range of approximately 280 micrometers (280 µm) to approximately 290 micrometers (290 µm), including the thickness of the first and second conductive layers 103 and 104 and, in some example embodiments, the thickness of an adhesive layer between the elastic support nodules 106 and the second conductive layer 104.

Figure 4:
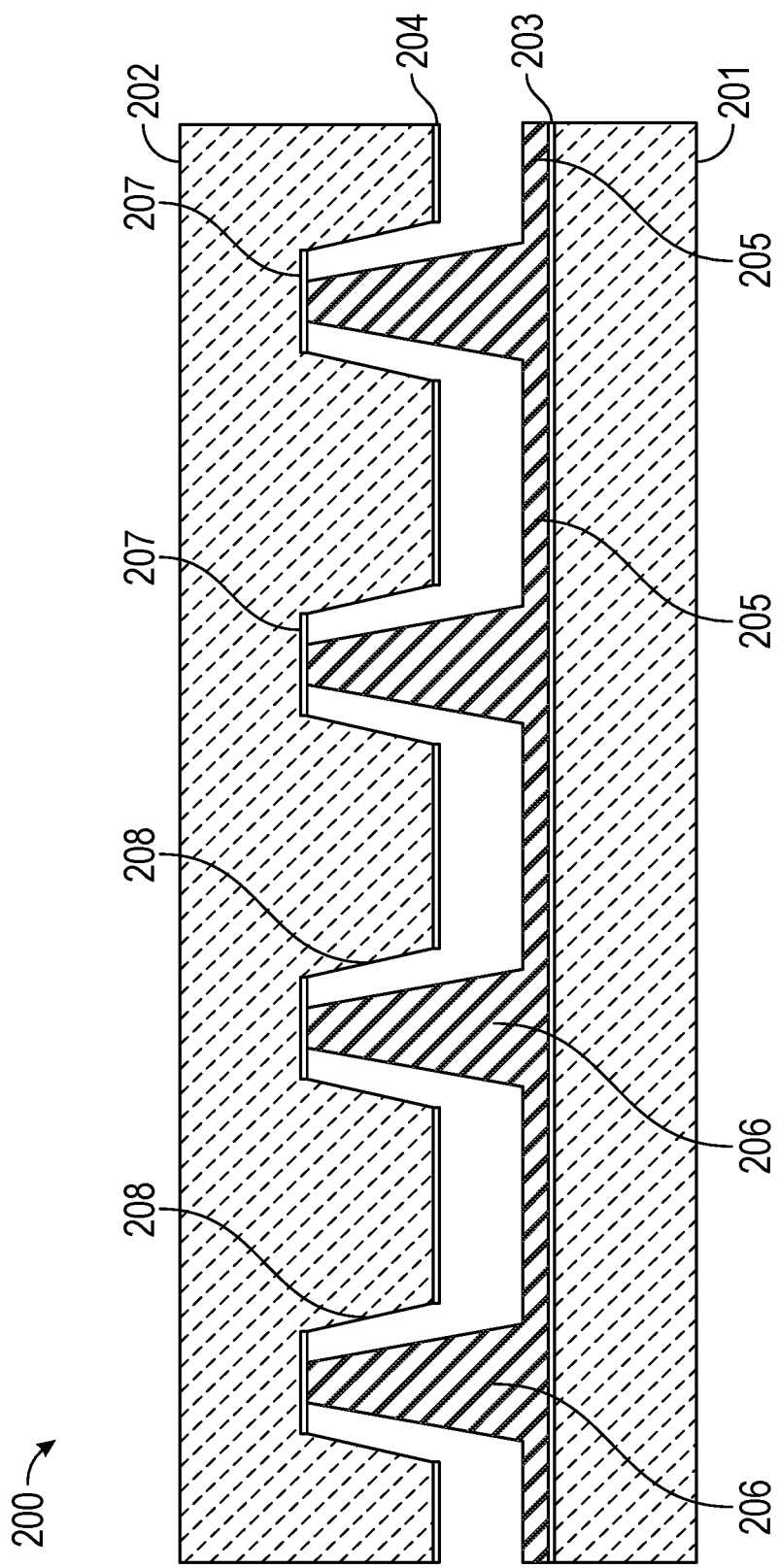
FIG. 4 is a cross-sectional diagram illustrating at least a portion of a single layer of an electrostatic actuator, according to some example embodiments.

FIG. 4 is a cross-sectional diagram illustrating at least a portion of a single electrostatic actuation layer 200 of an electrostatic actuator (e.g., an electrostatic actuator structure), according to some example embodiments. The electrostatic actuation layer 200 illustrated in FIG. 4 includes a first substrate 201 (e.g., a first substrate film) and a second substrate 202 (e.g., a second substrate film). In the example embodiments shown in FIG. 4, the first substrate 201 may have a thickness of 100 micrometers (100 µm), and the second substrate 202 may have a thickness of 175 micrometers (175 µm). The first substrate 201 may be a film that includes or otherwise provides a first conductive layer 203 (e.g., a first conductive electrode layer) applied on top of the first substrate 201. The first conductive layer 203 may form all or part of a first electrode. The second substrate 202 may be a film that includes or otherwise provides a second conductive layer 204 (e.g., a second conductive electrode layer) applied on top of the second substrate 202. The second conductive layer 204 may form all or part of a second electrode. According to various example embodiments, the first conductive layer 203, the second conductive layer 204, or both, are insulated.

The first substrate 201 (e.g., with the insulated first conductive layer 203) has a layer of electrically insulating elastomer material 205 (e.g., an electrically insulating elastomer coating) applied on top of the insulated first conductive layer 203 of the first substrate 201. Furthermore, there is a group (e.g., plurality or multitude) of elastic support nodules 206 arranged (e.g., in a grid array) and adhered on top of, or forming part of, the intrinsic structure of the layer of electrically insulating elastomer material 205. In the example embodiments shown in FIG. 4, the layer of electrically insulating elastomer material 205 may have a thickness of 20 micrometers (20 µm). Furthermore, according to certain example embodiments, the elastic support nodules 206 each have a height of 150 micrometers (150 µm). In addition, according to some example embodiments, the elastic support nodules 206 each have an aspect ratio of height to maximum width, and the aspect ratio may have a maximum value of two (2).

The layer of electrically insulating elastomer material 205, the group of elastic support nodules 206, or both may be applied using a suitable microfabrication technique (e.g. a thin film deposition technique). The group of elastic support nodules 206 may be fully or partially made of a silicon-based organic polymer (e.g., PDMS), rubber (e.g., natural or synthetic), or any suitable combination thereof. Furthermore, the group of elastic support nodules 206 may be arranged less than 10 millimeters (10 mm) apart from each other in distance, and in some example embodiments, the inter-nodule distance is less than 2 millimeters (2 mm). In certain example embodiments, the group of elastic support nodules 206 is arranged in a grid array, such as a spaced two-dimensional row-column grid array, as illustrated in FIG. 2. In some alternative example embodiments, the group of elastic support nodules 206 is arranged in a spaced triangular grid array, as illustrated in FIG. 3.

As shown in FIG. 4, the second substrate 202 may be microfabricated (e.g., etched) to provide wells 208 in the second substrate 202. The wells 208 may be arranged to match the group of elastic support nodules 206 applied to the first substrate 201. The wells 208 may be microfabricated using a suitable microfabrication technique (e.g., an anisotropic wet etching technique). The microfabricated second substrate 202 with the second conductive layer 204 may be turned upside down and placed on top of the group of elastic support nodules 206, such that the wells 208 coincide with the group of elastic support nodules 206 to form the electrostatic actuation layer 200 (e.g., a single electrostatic actuation layer that may be combined with one or more additional electrostatic actuation layers into a multi-layer electrostatic actuator structure). In the electrostatic actuation layer 200, the elastic support nodules 206 may reside in the wells 208. Before the second substrate 202 is placed on top of the group of elastic support nodules 206, there may be adhesive 207 applied to the wells 208, to the group of elastic support nodules 206, or to both. In the example embodiments shown in FIG. 4, the depth of the wells 208 may be 90 micrometers (90 μm). Other suitable depths may be used, depending on the thickness of the second substrate 202 to be microfabricated.

As the first substrate 201 and the second substrate 202 have been stacked one above the other (e.g., to form the electrostatic actuation layer 200), the distance between the first conductive layer 203 and the second conductive layer 204, which may be the distance between the first and second electrodes, in the electrostatic actuation layer 200 may be less than 1000 micrometers (1000 μm) and, in some example embodiments, less than 200 micrometers (200 μm). In the electrostatic actuation layer 200, the distance between said first and second conductive layers 203 and 204 may be 80 micrometers (80 μm). Due to the wells 208 of the second substrate 202 coinciding (e.g., matching) with the group of elastic support nodules 206 on the first substrate 201, the distance between the first and second conductive layers 203 and 204 may be considerably less than the height of the group of elastic support nodules 206.

In the electrostatic actuation layer 200, the group of elastic support nodules 206 provides a compression space between the first and second conductive layers 203 and 204. In many example embodiments, the compression space is not entirely filled with solid material (e.g., the compression space is less than fully filled with solid material, such as solid elastic material). In the example embodiments shown in FIG. 4, the compression space may be 80 micrometers (80 μm) thick, and the layer of electrically insulating elastomer material 205 may be 20 micrometers (20 μm) thick, thus leaving a space gap of 60 micrometers (60 μm). This space gap in the compression space may be filled with fluid (e.g., air, nitrogen, or a dielectric liquid, such as dielectric hydraulic fluid) in places where the elastic support nodules 206 are not present.

In the example embodiments shown in FIG. 4, the electrostatic actuation layer 200 (e.g., one of multiple electrostatic actuation layers within an electrostatic actuator) may also include a group of limiting nodules, which may be arranged in a grid array (e.g., similar to the row-column grid array illustrated in FIG. 2 or the triangular grid array illustrated in FIG. 3). This group of limiting nodules may be arranged between or among the elastic support nodules 206 and between the first substrate 201 and the second substrate 202, for limiting the compression of the compression space and thereby limiting the compression of the electrostatic actuation layer 200 overall. In the example embodiments shown in FIG. 4, any one or more of the conductive surfaces of the first and second conductive layers 203 and 204 on either or both sides of the space gap, the elastic support nodules 206, or both may be inherently hydrophobic, hydrophobically or superhydrophobically coated, hydrophobically or superhydrophobically treated, or any suitable combination thereof.

The electrostatic actuation layer 200 is configured (e.g., arranged) to compress when a sufficient voltage difference is applied between at least the first conductive layer 203 (e.g., functioning as a first electrode) and the second conductive layer 204 (e.g., functioning as a second electrode). Hence, an electrostatic actuator (e.g., electrostatic actuator structure) that includes one or more electrostatic actuation layers (e.g., electrostatic actuation layer 200) may be configured to compress in response to such a voltage difference between the first conductive layer 203 and the second conductive layer 204 (e.g., between respectively first and second conductive surfaces thereof) exceeding a threshold voltage difference (e.g., a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g., embedded) as part of a flexible or elastic substrate. For example, the electrostatic actuator itself may be intrinsically flexible, elastic, or both, and may be included in such a flexible or elastic substrate. The electrostatic actuation layer 200 shown in FIG. 4 may have an overall thickness in the range of approximately 355 micrometers (355 μm) to approximately 365 micrometers (365 μm), including the thickness of the first and second conductive layers 203 and 204 and, in some example embodiments, the thickness of the adhesive 207 applied between the wells 208 and the elastic support nodules 206.

Figure 5:
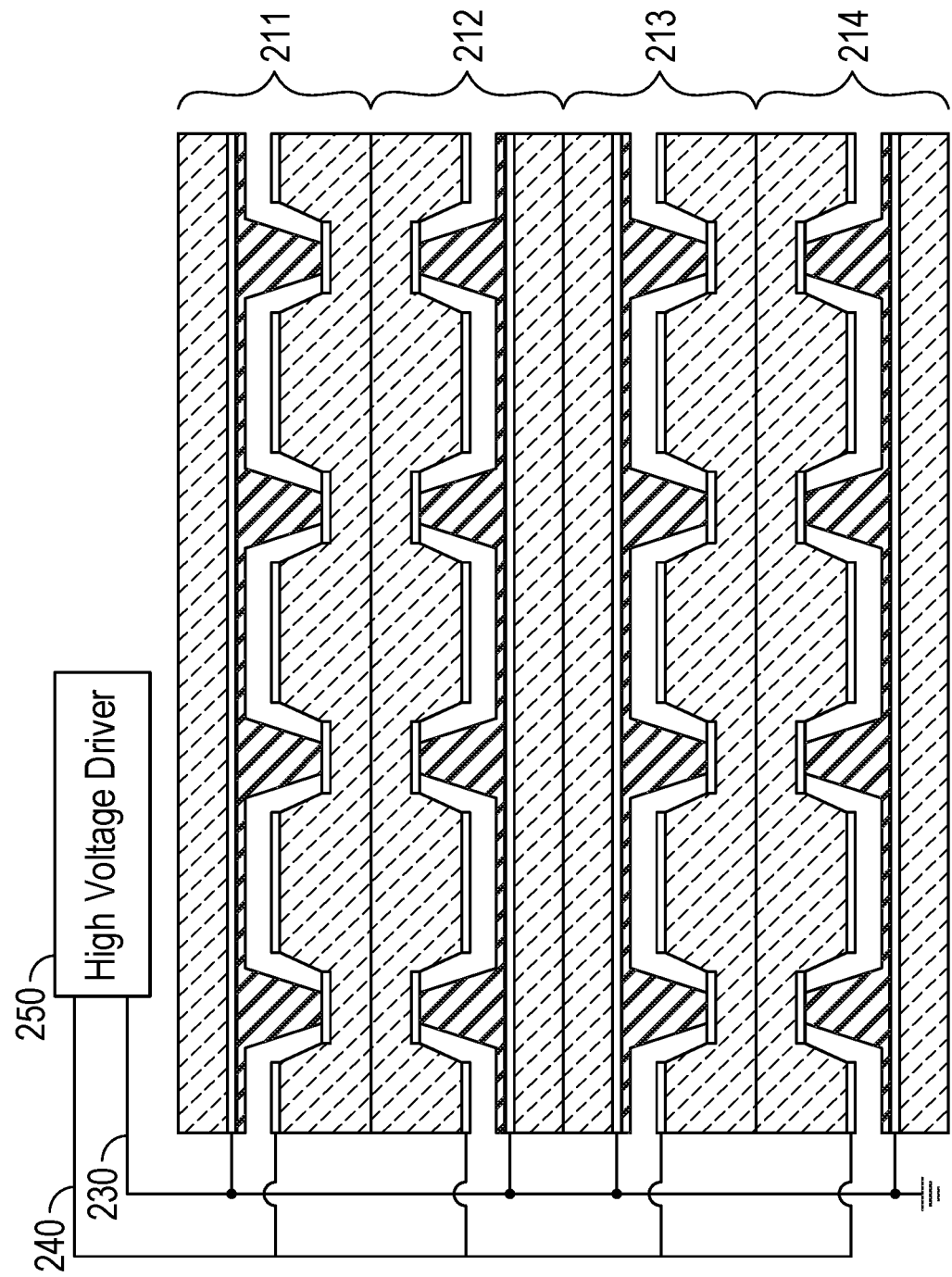
FIG. 5 is a cross-sectional diagram illustrating at least a portion of an electrostatic actuator with four electrostatic actuation layers, according to some example embodiments.

FIG. 5 is a cross-sectional diagram illustrating at least a portion of an electrostatic actuator (e.g., electrostatic actuator structure) with four electrostatic actuation layers, according to some example embodiments. The illustrated electrostatic actuator includes four electrostatic actuation layers 211-214. In the example embodiments shown in FIG. 5, each of the electrostatic actuation layers 211-214 includes a corresponding first substrate (e.g., first substrate 201) with a corresponding first conductive layer (e.g., first conductive layer 203), and the first conductive layer may be part of a first electrode 230. Similarly, each of the electrostatic actuation layers 211-214 includes a corresponding second substrate (e.g., second substrate 202) with a corresponding second conductive layer (e.g., second conductive layer 204), and the second conductive layer may be part of a second electrode 240. Moreover, the first conductive layer may be insulated (e.g., from its first substrate, from another conductive layer, or from both), the second conductive layer may be insulated (e.g., from its second substrate, from another conductive layer, or from both), or both.

Each of the electrostatic actuation layers 211-214 may further include a grid array that includes a group of elastic support nodules (e.g., elastic support nodules 206), and the group of elastic support nodules may be arranged between their corresponding first and second substrates, such that there is arranged a compression space between the first and second conductive layers (e.g., first and second conductive layers 203 and 204). In many example embodiments, the compression space is not entirely filled with solid material (e.g., the compression space is less than fully filled with solid material, such as solid elastic material). According to various example embodiments, the electrostatic actuator that includes the illustrated electrostatic actuation layers 211-214 may further include a high voltage driver 250 (e.g., a high voltage driver with a flyback-mode boost converter).

In the example embodiments shown in FIG. 5, the electrostatic actuation layers 211-214 are stacked one above the other, such that similar structural elements of the electrostatic actuation layers 211-214 coincide at least partially (e.g., coincide fully). For example, the elastic support nodules (e.g., elastic support nodules 206) of one electrostatic actuation layer 211 may be fully or partially aligned over the elastic support nodules of another electrostatic actuation layer 212. Similarly, the wells (e.g., wells 208) of one electrostatic actuation layer 211 may be fully or partially aligned over the wells of another electrostatic actuation layer 212. In alternative example embodiments, the electrostatic actuation layers 211-214 may be imbricatedly stacked (e.g., like overlapping roof tiles).

The electrostatic actuator shown in FIG. 5 is configured to compress when a sufficient voltage difference is applied between the first electrode 230 and the second electrode 240 (e.g., compress in response to such a voltage difference exceeding a threshold voltage difference, such as a predetermined threshold voltage difference). Due to the coinciding, adhered, and joint structure of the electrostatic actuation layers 211-214, the compression effect of the electrostatic actuator structure is increased substantially as a function of the number of coinciding electrostatic actuation layers. With the help of the adhered and joint structure of the electrostatic actuation layers 211-214, the appearance of holes or inter-layer gaps is avoided, and the potential reduction of the compression effect due to the potential inter-pillar swallowing for air compression is covered. Furthermore, potential inter-layer bouncing or non-uniform separation (e.g., due to inter-layer pulling forces resulting from the compression of each layer) is also avoided.

In the example embodiments shown in FIG. 5, the electrostatic actuation layers 211-216 are stacked one above another (e.g., as a stack of electrostatic actuation layers), such that a bifunctional substrate (e.g., a bifunctional substrate film) forms both the first substrate of one electrostatic actuation layer (e.g., electrostatic actuation layer 212) and the first substrate of an adjacent electrostatic actuation layer (e.g., electrostatic actuation layer 211) among the electrostatic actuation layers 211-216, one extending below the bifunctional substrate and the other extending above the bifunctional substrate. Alternatively, the bifunctional substrate may form both the second substrate of one electrostatic actuation layer (e.g., electrostatic actuation layer 212) and the second substrate of an adjacent electrostatic actuation layer (e.g., electrostatic actuation layer 211). Accordingly, such a bifunctional substrate can be considered as being or including (e.g., containing) the boundary between two adjacent electrostatic actuation layers (e.g., between the electrostatic actuation layers 211 and 212), as well as being or including the junction of the two adjacent electrostatic actuation layers. The bifunctional substrate may include a mesh of elastomer material.

Each of the electrostatic actuation layers 211-214 may have an overall thickness of approximately 365 micrometers (365 µm). Accordingly, the thickness of the electrostatic actuator structure with the four electrostatic actuation layers 211-214 may be approximately four times 365 micrometers (4×365 µm), thus resulting in a total thickness of approximately 1.46 millimeters (1.46 mm). The electrostatic actuator structure may be hermetically sealed. The described compressing nodule structure, together with hermetic sealing, allows the compression of the electrostatic actuation layers 211-214 as a pump (e.g., a pneumatic pump or a hydraulic pump). In addition to the increased actuation produced by the combined compression of the electrostatic actuation layers 211-214, when hermetically sealed, the above-described elastic support nodules allow the compression of these layers as a pump (e.g., a pneumatic pump or a hydraulic pump). Fluid (e.g., gas or liquid) configured to flow into or out of the space gaps within the electrostatic actuation layers 211-214 can be used to actuate various elastic structures that are affected by the pressure of the fluid. This effect may be used to create a textured surface or to actuate some part of a system via pneumatic or hydraulic means.

Figure 6:
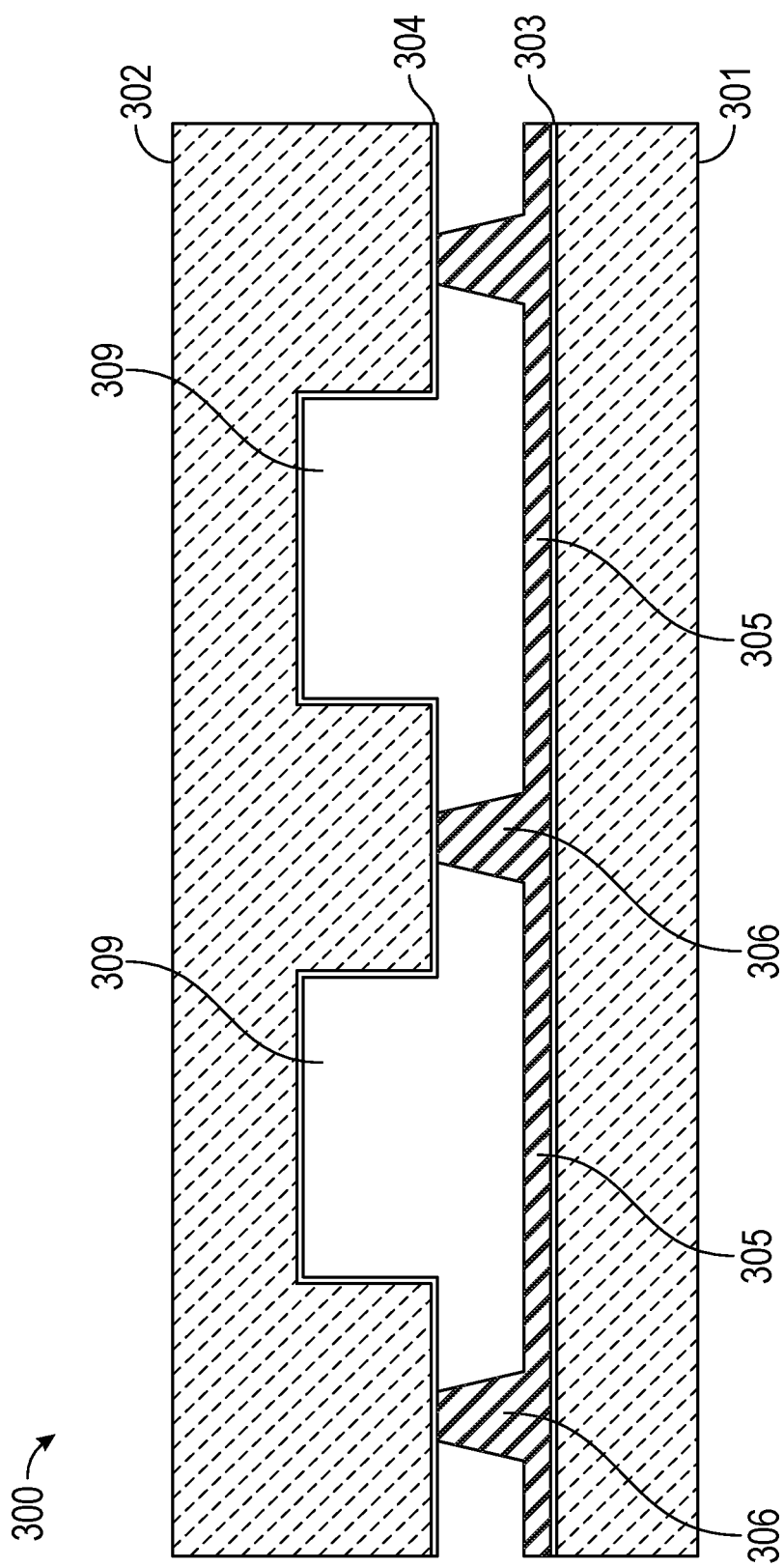
FIG. 6 is a cross-sectional diagram illustrating at least a portion of a single layer of an electrostatic actuator, according to some example embodiments.

FIG. 6 is a cross-sectional diagram illustrating at least a portion of a single electrostatic actuation layer 300 that may form all or part of an electrostatic actuator (e.g., electrostatic actuator structure), according to some example embodiments. The illustrated single electrostatic actuation layer 300 includes a first substrate 301 (e.g., a first substrate film) and a second substrate 302 (e.g., a second substrate film). In the example embodiments shown in FIG. 6, the first substrate 301 may have a thickness of 100 micrometers (100 µm), and the second substrate 302 may have a thickness of 175 micrometers (175 µm). The first substrate 301 may be a film that includes or otherwise provides a first conductive layer 303 (e.g., a first conductive electrode layer) applied on top of the first substrate 301. The first conductive layer 303 may form all or part of a first electrode. The second substrate 302 may be a film that includes or otherwise provides a second conductive layer 304 (e.g., a second conductive electrode layer) applied on top of the second substrate 302. The second conductive layer 304 may form all or part of a second electrode. According to various example embodiments, the first conductive layer 303, the second conductive layer 304, or both, are insulated.

The first substrate 301 (e.g., with the insulated first conductive layer 303) has a layer of electrically insulating elastomer material 305 (e.g., an electrically insulating elastomer coating) applied on top of the insulated first conductive layer 303 of the first substrate 301. Furthermore, there is a group (e.g., plurality or multitude) of elastic support nodules 306 arranged (e.g., in a grid array) and adhered on top of, or forming part of, the intrinsic structure of said layer of electrically insulating elastomer material 305. In the example embodiments shown in FIG. 6, the layer of electrically insulating elastomer material 305 may have a thickness of 20 micrometers (20 µm). Furthermore, according to certain example embodiments, the elastic support nodules 306 each have a height of 80 micrometers (80 µm). In addition, according to some example embodiments, the elastic support nodules 306 each have an aspect ratio of height to maximum width, and the aspect ratio may have a maximum value of two (2).

The layer of electrically insulating elastomer material 305, the group of elastic support nodules 306, or both may be applied using a suitable microfabrication technique (e.g., a thin film deposition technique). The group of elastic support nodules 306 may be fully or partially made of a silicon-based organic polymer (e.g., PDMS), rubber (e.g., natural or synthetic), or any suitable combination thereof. Furthermore, the group of elastic support nodules 306 may be arranged less than 10 millimeters (10 mm) apart from each other in distance, and in some example embodiments, the inter-nodule distance is less than 2 millimeters (2 mm). In certain example embodiments, the group of elastic support nodules 306 is arranged in a grid array, such as a spaced two-dimensional row-column grid array, as illustrated in FIG. 2. In some alternative example embodiments, the group of elastic support nodules 306 is arranged in a spaced triangular grid array, as illustrated in FIG. 3.

Furthermore, the electrostatic actuation layer 300 may include one or more fluid reservoirs 309 (e.g., gas reservoirs, such as air reservoirs) that reduce the force involved for overall compression of the electrostatic actuation layer 300 when fluid displacement is restricted by contour sealing, when fluid displacement is restricted by compression speed (e.g., depending on the hydrodynamic properties of the fluid), when the fluid compresses, when the fluid moves from a compression space (e.g., a space gap), or any suitable combination thereof. The second substrate 302 may be microfabricated (e.g., etched) to provide the fluid reservoirs 309 (e.g., gas reservoirs) in the second substrate 302. The fluid reservoirs 309 may be arranged to reduce the compression ratio of fluid volume (e.g., gas volume, such as air volume). The fluid reservoirs 309 may be microfabricated using a suitable microfabrication technique (e.g., an anisotropic wet etching technique). The microfabricated second substrate 302 with the second conductive layer 304 may be turned upside down and placed on top of the group of elastic support nodules 306 to form the electrostatic actuation layer 300. In the example embodiments shown in FIG. 6, the depth of the fluid reservoirs 309 may be 90 micrometers (90 μm). Other suitable depths may be used, depending on the thickness of the second substrate 302 to be microfabricated. The one or more fluid reservoirs 309 are in fluid communication with (e.g., connected to) one or more compression spaces in the electrostatic actuation layer 300.

In various example embodiments, the horizontal contour of these fluid reservoirs 309 (e.g., wells) can be ellipsoidal, and their centers can be located equidistant from each nodule in each group of four (4) neighboring elastic support nodules (e.g., as shown in in FIG. 2 or FIG. 3). Alternatively, the fluid reservoirs 309 can have an arbitrary shape and can be located outside of the pillar region (e.g. somewhere in the contour of the elastic support nodules layer 306).

Figure 7:
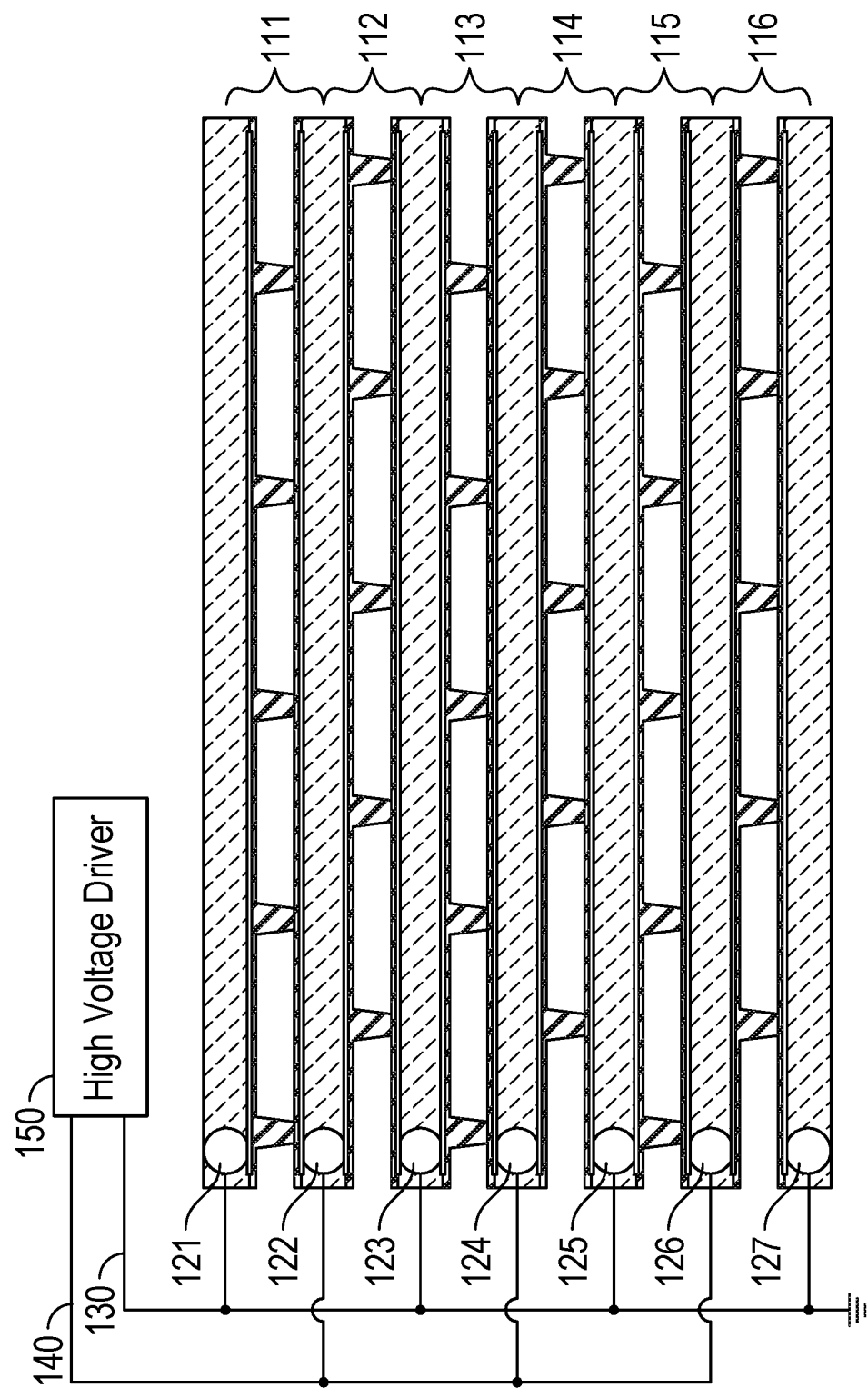
FIG. 7 is a cross-sectional diagram illustrating at least a portion of an electrostatic actuator with six electrostatic actuation layers, according to some example embodiments.

FIG. 7 is a cross-sectional diagram illustrating at least a portion of an electrostatic actuator (e.g., electrostatic actuator structure) with six electrostatic actuation layers, according to some example embodiments. The illustrated electrostatic actuator includes six electrostatic actuation layers 111-116. In the example embodiments shown in FIG. 7, each of the electrostatic actuation layers 111-116 includes a corresponding first substrate (e.g., first substrate 101) with a corresponding first conductive layer (e.g., first conductive layer 103), and the first conductive layer may be part of a first electrode 130. Similarly, each of the electrostatic actuation layers 111-116 includes a corresponding second substrate (e.g., second substrate 102) with a corresponding second conductive layer (e.g., second conductive layer 104), and the second conductive layer may be part of a second electrode 140. Moreover, the first conductive layer may be insulated (e.g., from its first substrate, from another conductive layer, or from both), the second conductive layer may be insulated (e.g., from its second substrate, from another conductive layer, or from both), or both.

In the example embodiments shown in FIG. 7, the electrostatic actuation layers 111-116 are stacked one above another (e.g., as a stack of electrostatic actuation layers), such that a bifunctional substrate (e.g., a bifunctional substrate film) forms both the first substrate of one electrostatic actuation layer (e.g., electrostatic actuation layer 112) and the first substrate of an adjacent electrostatic actuation layer (e.g., electrostatic actuation layer 111) among the electrostatic actuation layers 111-116, one extending below the bifunctional substrate and the other extending above the bifunctional substrate. Alternatively, the bifunctional substrate may form both the second substrate of one electrostatic actuation layer (e.g., electrostatic actuation layer 112) and the second substrate of an adjacent electrostatic actuation layer (e.g., electrostatic actuation layer 111). Accordingly, such a bifunctional substrate can be considered as being or including (e.g., containing) the boundary between two adjacent electrostatic actuation layers (e.g., between the electrostatic actuation layers 111 and 112), as well as being or including the junction of the two adjacent electrostatic actuation layers. The bifunctional substrate may include a mesh of elastomer material.

According to various example embodiments, the electrostatic actuator that includes the illustrated electrostatic actuation layers 111-116 may further include a high voltage driver 150 (e.g., a high voltage driver with a flyback-mode boost converter). Furthermore, any one or more of the substrates (e.g., a bifunctional substrate configured or functioning as both the first substrate of one electrostatic actuation layer and the second substrate of an adjacent electrostatic actuation layer) in the stack of electrostatic actuation layers 111-116 may include an embedded connection element. The electrostatic actuation layers 111-116 are shown in FIG. 7 as including embedded connection elements 121-127, any one or more of which may take the example form of an embedded metal wire or other conductive filament. The embedded connection elements 121-127 each connect one or more of the conductive layers (e.g., first conductive layer 103 or second conductive layer 104, one or more of which may be or include a conductive coating) to the high voltage driver 150. Within the stack of electrostatic actuation layers 111-116, the interior (e.g., non-exterior) embedded connection elements 122-126 connect the conductive electrode layers of the interior bifunctional substrates together and to the high voltage driver 150, as shown in FIG. 7.

Each of the electrostatic actuation layers 111-116 may further include a grid array that includes a group of elastic support nodules (e.g., elastic support nodules 106), and the group of elastic support nodules may be arranged between their corresponding first and second substrates, such that there is arranged a compression space between the first and second conductive layers (e.g., first and second conductive layers 103 and 104). In many example embodiments, the compression space is not entirely filled with solid material (e.g., the compression space is less than fully filled with solid material, such as solid elastic material).

Figure 8:
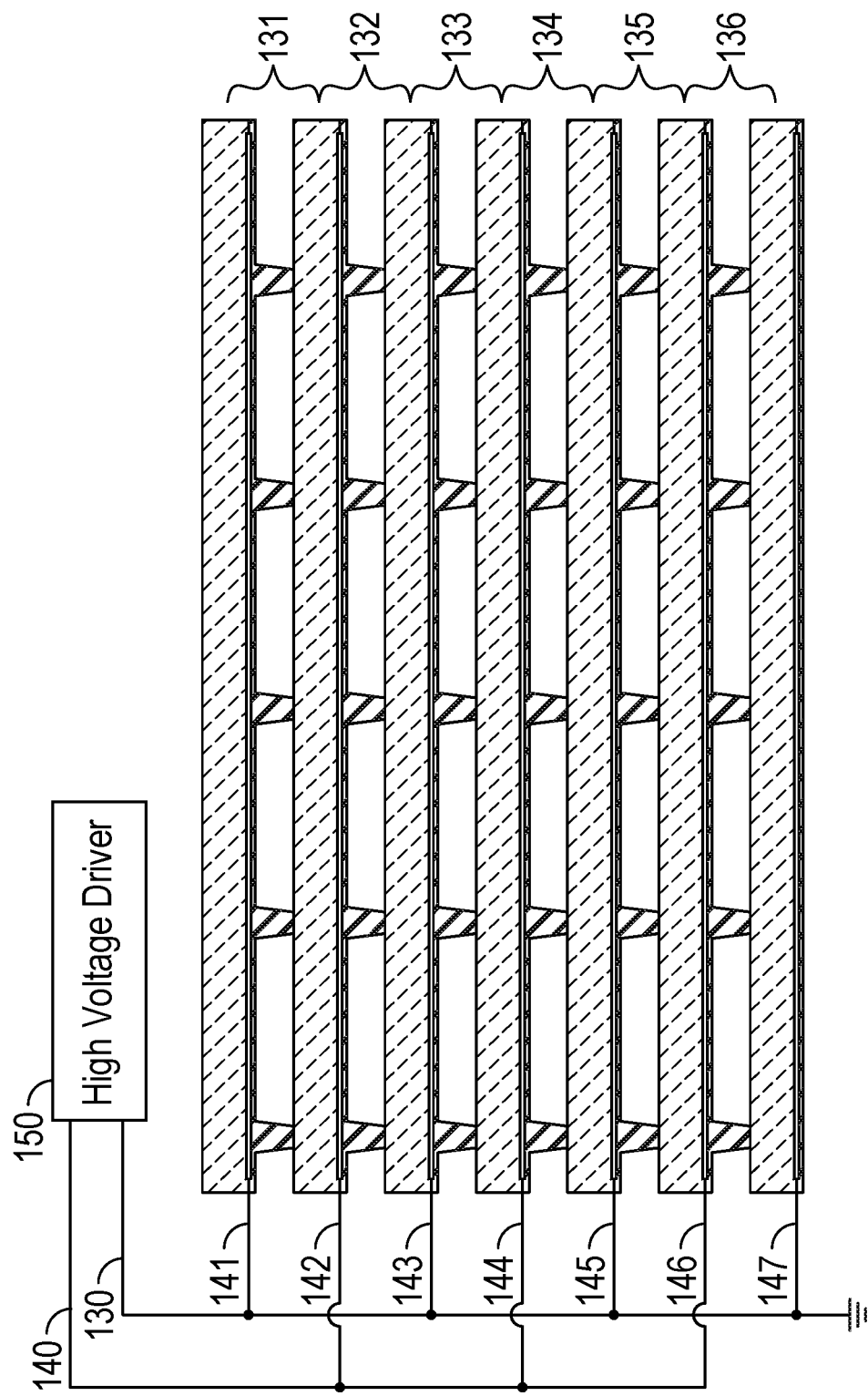
FIG. 8 is a cross-sectional diagram illustrating at least a portion of an electrostatic actuator with six electrostatic actuation layers, according to some example embodiments.

FIG. 8 is a cross-sectional diagram illustrating at least a portion of an electrostatic actuator (e.g., electrostatic actuator structure) with six electrostatic actuation layers, according to some example embodiments. The illustrated electrostatic actuator includes six electrostatic actuation layers 131-136. In the example embodiments shown in FIG. 8, each of the electrostatic actuation layers 131-136 includes a corresponding first substrate (e.g., first substrate 101) with a corresponding first conductive layer (e.g., first conductive layer 103), and the first conductive electrode layer may be part of a first electrode (e.g., first electrode 130). Similarly, each of the electrostatic actuation layers 131-136 includes a corresponding second substrate (e.g., second substrate 102) with a corresponding second conductive layer (e.g., second conductive layer 104), and the second conductive layer may be part of a second electrode (e.g., second electrode 140). Moreover, the first conductive layer may be insulated (e.g., from its first substrate, from another conductive layer, or from both), the second conductive layer may be insulated (e.g., from its second substrate, from another conductive layer, or from both), or both.

In the example embodiments shown in FIG. 8, the electrostatic actuation layers 131-136 are stacked one above another (e.g., as a stack of electrostatic actuation layers), such that a bifunctional substrate (e.g., a bifunctional substrate film) forms both the first substrate of one electrostatic actuation layer (e.g., electrostatic actuation layer 132) and the second substrate of an adjacent electrostatic actuation layer (e.g., electrostatic actuation layer 131) among the electrostatic actuation layers 131-136, one extending below the bifunctional substrate and the other extending above the bifunctional substrate. Accordingly, such a bifunctional substrate can be considered as being or including (e.g., containing) the boundary between two adjacent electrostatic actuation layers (e.g., between the electrostatic actuation layers 131 and 132), as well as being or including the junction of the two adjacent electrostatic actuation layers. The bifunctional substrate may include a mesh of elastomer material.

According to various example embodiments, the electrostatic actuator that includes the illustrated electrostatic actuation layers 131-136 may further include a high voltage driver (e.g., high voltage driver 150, which may have a flyback-mode boost converter). Furthermore, any one or more of the substrates (e.g., a bifunctional substrate configured or functioning as both the first substrate of one electrostatic actuation layer and the second substrate of an adjacent electrostatic actuation layer) in the stack of electrostatic actuation layers 131-136 may include an embedded connection element. The electrostatic actuation layers 131-136 are shown in FIG. 8 as including embedded connection elements 141-147, any one or more of which may take the example form of an embedded wire or other conductive filament. The embedded connection elements 141-147 each connect one or more of the conductive layers (e.g., first conductive layer 103 or second conductive layer 104, one or more of which may be or include a conductive coating) to the high voltage driver (e.g., high voltage driver 150), as shown in FIG. 8.

Each of the electrostatic actuation layers 131-136 may further include a grid array that includes a group of elastic support nodules (e.g., elastic support nodules 106), and the group of elastic support nodules may be arranged between their corresponding first and second substrates, such that there is arranged a compression space between the first and second conductive layers (e.g., first and second conductive layers 103 and 104). In many example embodiments, the compression space is not entirely filled with solid material (e.g., the compression space is less than fully filled with solid material, such as solid elastic material).

Figure 9:
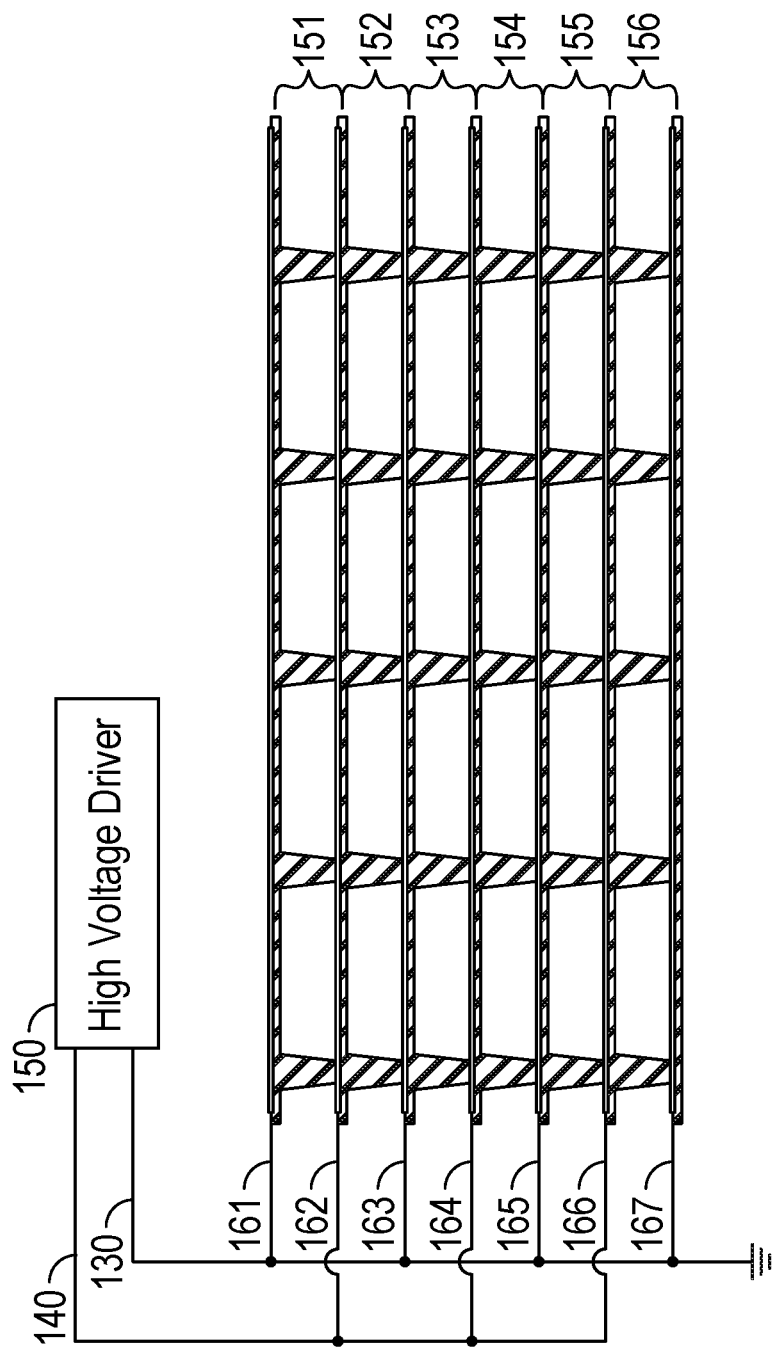
FIG. 9 is a cross-sectional diagram illustrating at least a portion of an electrostatic actuator with six electrostatic actuation layers, according to some example embodiments.

FIG. 9 is a cross-sectional diagram illustrating at least a portion of an electrostatic actuator (e.g., electrostatic actuator structure) with six electrostatic actuation layers, according to some example embodiments. The illustrated electrostatic actuator includes six electrostatic actuation layers 151-156. In the example embodiments shown in FIG. 9, each of the electrostatic actuation layers 151-156 includes a corresponding first substrate (e.g., first substrate 101) with a corresponding first conductive layer (e.g., first conductive layer 103), and the first conductive layer may be part of a first electrode (e.g., first electrode 130). Similarly, each of the electrostatic actuation layers 151-156 includes a corresponding second substrate (e.g., second substrate 102) with a corresponding second conductive layer (e.g., second conductive layer 104), and the second conductive layer may be part of a second electrode (e.g., second electrode 140). Moreover, the first conductive layer may be insulated (e.g., from its first substrate, from another conductive layer, or from both), the second conductive layer may be insulated (e.g., from its second substrate, from another conductive layer, or from both), or both.

In the example embodiments shown in FIG. 9, the electrostatic actuation layers 151-156 are stacked one above another (e.g., as a stack of electrostatic actuation layers), such that a bifunctional layer of electrically insulating elastomer material forms both the first substrate of one electrostatic actuation layer (e.g., electrostatic actuation layer 152) and the second substrate of an adjacent electrostatic actuation layer (e.g., electrostatic actuation layer 151) among the electrostatic actuation layers 151-156, one extending below the bifunctional layer and the other extending above the bifunctional layer. Accordingly, such a bifunctional layer of electrically insulating elastomer material can be considered as being or including (e.g., containing) the boundary between two adjacent electrostatic actuation layers (e.g., between the electrostatic actuation layers 151 and 152), as well as being or including the junction of the two adjacent electrostatic actuation layers. The bifunctional substrate may include a mesh of elastomer material. Furthermore, in certain example embodiments, a bifunctional conductive layer (e.g., a bifunctional conductive electrode layer) is applied to the bifunctional layer of electrically insulating elastomer material and thus arranged to act as both a first conductive layer (e.g., first conductive layer 103) and a second conductive layer (e.g., second conductive layer 104) for a pair of adjacent electrostatic actuation layers (e.g., electrostatic actuation layers 151 and 152), one extending below the bifunctional conductive layer and the other extending above the bifunctional conductive layer.

According to various example embodiments, the electrostatic actuator that includes the illustrated electrostatic actuation layers 151-156 may further include a high voltage driver (e.g., high voltage driver 150, which may have a flyback-mode boost converter). Furthermore, any one or more of the bifunctional layers (e.g., a bifunctional layer of electrically insulating elastomer material or a bifunctional conductive layer) in the stack of electrostatic actuation layers 151-156 may include an embedded connection element. The electrostatic actuation layers 151-156 are shown in FIG. 9 as including embedded connection elements 161-167, any one or more of which may take the example form of an embedded wire or other conductive filament. The embedded connection elements 161-167 each connect one or more of the conductive layers (e.g., one or more bifunctional conductive layers, any one or more of which may be or include a conductive coating) to the high voltage driver (e.g., high voltage driver 150), as shown in FIG. 9.

Each of the electrostatic actuation layers 151-156 may further include a grid array that includes a group of elastic support nodules (e.g., elastic support nodules 106), and the group of elastic support nodules may be arranged between their corresponding first and second substrates, such that there is arranged a compression space between the first and second conductive layers (e.g., first and second conductive layers 103 and 104). In many example embodiments, the compression space is not entirely filled with solid material (e.g., the compression space is less than fully filled with solid material, such as solid elastic material).

Any combination of one or more of the above-described electrostatic actuation layers (e.g., electrostatic actuation layer 100, 200, or 300) may be included in an electrostatic actuator (e.g., an electrostatic actuator structure), and such included electrostatic actuation layers may be stacked one above the other to form at least two stacks of electrostatic actuation layers, as illustrated in FIGS. 10A, 10B, 11A, and 11B. In the example embodiments shown in FIGS. 10A, 10B, 11A, and 11B, any one or more of the first and second conductive surfaces of the first and second conductive layers on either or both sides of the space gap, the elastic support nodules, or both, may be inherently hydrophobic, hydrophobically or superhydrophobically coated, hydrophobically or superhydrophobically treated, or any suitable combination thereof.

FIGS. 10A, 10B, 11A, and 11B are cross-sectional diagrams each illustrating an electrostatic actuator 1000 (e.g., electrostatic actuator structure), which may have multiple (e.g., at least two stacks) of electrostatic actuation layers (e.g., at least two separate stacks that each include multiple instances of the electrostatic actuation layer 100, 200, or 300). In alternative example embodiments, the electrostatic actuator 1000 has a single stack, and the single stack has a cavity (e.g., a hole) that, when viewed in cross-section, has the appearance shown in FIG. 10A, 10B, 11A, or 11B. Each stack includes at least one fluid reservoir (e.g., fluid reservoir 309, which may be a gas reservoir, such as an air reservoir) arranged between the at least two stacks of electrostatic actuation layers. Moreover, there may be an elastic surface layer arranged on top of the at least two stacks of electrostatic actuation layers and on top of said at least one fluid reservoir (e.g., covering both the at least two stacks and the at least one fluid reservoir).

Figure 10A:
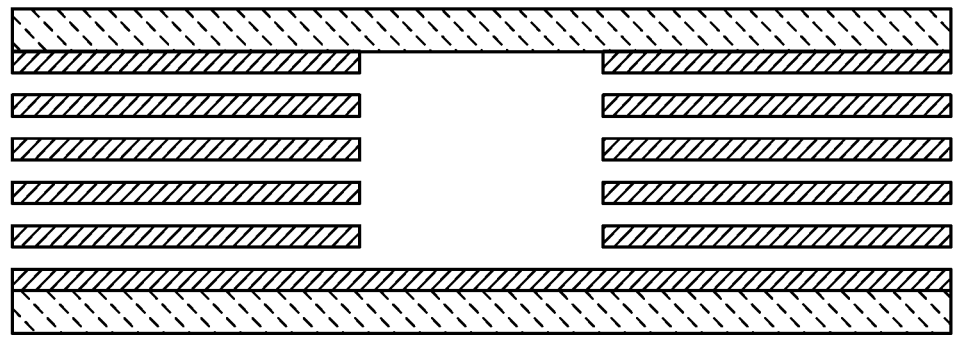
FIGS. 10A and 10B are cross-sectional diagrams each illustrating at least two stacks of electrostatic actuation layers, according to some example embodiments.
Figure 10B:
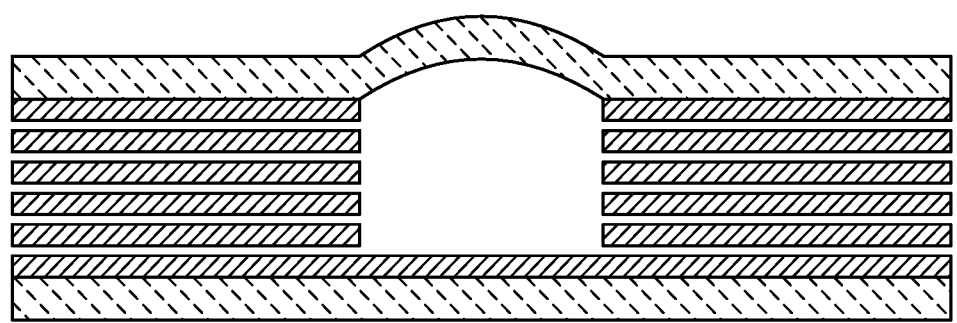
Figure 11A:
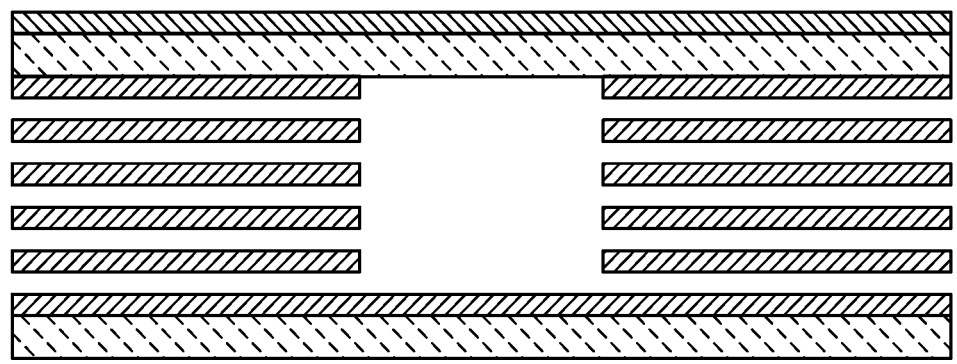
FIGS. 11A and 11B are cross-sectional diagrams each illustrating at least two stacks of electrostatic actuation layers, with an additional firm structure, according to some example embodiments.
Figure 11B:
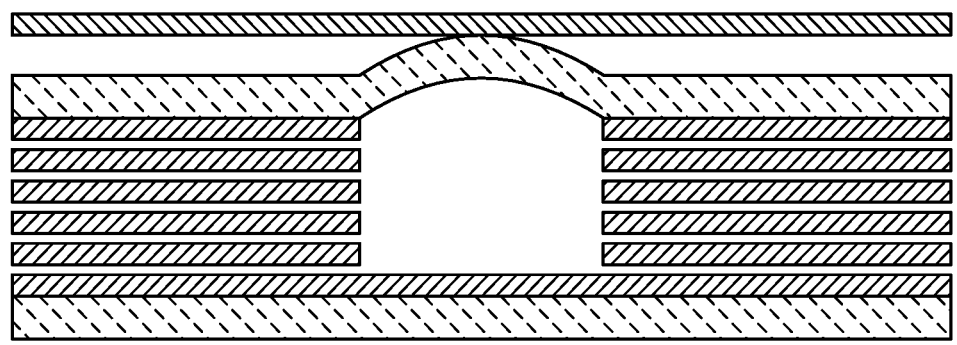

In FIGS. 11A and 11B, the electrostatic actuator 1000 also has an additional firm (e.g., rigid) structure on top of the elastic surface layer. The firm structure may facilitate a homogeneous (e.g., flat) area of actuation, collect actuation power from multiple bulges, protect flexible layers from the environment, or any suitable combination thereof. FIGS. 10A and 11A depict the electrostatic actuator 1000 in a state of rest. FIGS. 10B and 11B depict the electrostatic actuator 1000 when the stacked electrostatic actuation layers are being compressed, such that the elastic surface layer on top of at least one fluid reservoir bulges accordingly as a result of the electrostatic actuation layers being compressed. In FIGS. 11A and 11B, the electrostatic actuator 1000 may include an additional grid array of limiting nodules, which may be arranged between the elastic surface layer and the firm structure, for facilitating the entrance of air between both layers in the expansion process from the configuration shown in FIG. 11A to the configuration shown in FIG. 11B.

Figure 12A:
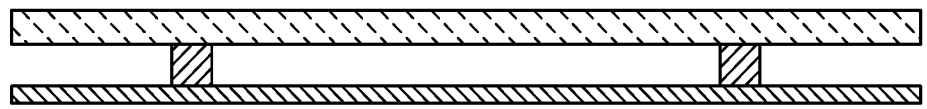
FIGS. 12A, 12B, and 12C are cross-sectional diagrams each illustrating at least a portion of a single layer of an electrostatic actuator, according to some example embodiments.
Figure 12B:
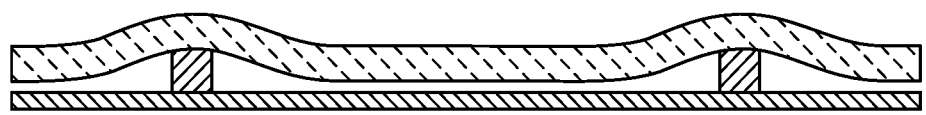
Figure 12C:
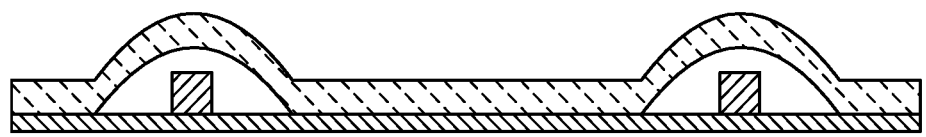

FIGS. 12A, 12B, and 12C are cross-sectional diagrams each illustrating at least a portion of a single layer (e.g., a single electrostatic actuation layer) within the electrostatic actuator 1000, according to some example embodiments. In some example embodiments, such a single layer forms the entirety of an electrostatic actuation structure. In alternative example embodiments, such a single layer is one layer (e.g., a topmost or exterior layer) among multiple electrostatic actuation layers included in an electrostatic actuation structure. As shown in FIGS. 12A, 12B, and 12C, the illustrated single layer has a flexible upper substrate.

FIG. 12A depicts the single layer (e.g., the single electrostatic actuation layer) in a state of rest. FIG. 12B depicts the single layer when being partially compressed (e.g., due to a voltage difference across its first and second electrodes transgressing (e.g., exceeding) a first threshold voltage difference). FIG. 12C depicts the single layer when being fully compressed (e.g., due to the voltage difference across its first and second electrodes transgressing a second threshold voltage difference, which may be higher than the first threshold voltage difference). In FIGS. 12B and 12C, as the flexible upper substrate of the single layer is being compressed, fluid flows from the corresponding compression space (e.g., space) and creates one or more bulges in the flexible upper substrate. These bulges may occur at the positions of the elastic support nodules (e.g., elastic support nodules 106).

As noted above, in certain example embodiments, one or more electrostatic actuation layers (e.g., electrostatic actuation layer 100, 200, or 300) within the electrostatic actuator 1000 (e.g., electrostatic actuator structure) may be stacked one above the other in an aligned manner. For example, the elastic support nodules (e.g., elastic support nodules 106) of one electrostatic actuation layer may be fully or partially aligned over the elastic support nodules of another (e.g., adjacent) electrostatic actuation layer. Similarly, if present, the wells (e.g., wells 208) of one electrostatic actuation layer may be fully or partially aligned over the wells of another (e.g., adjacent) electrostatic actuation layer.

However, in certain alternative example embodiments, one or more electrostatic actuation layers (e.g., electrostatic actuation layer 100, 200, or 300) within the electrostatic actuator 1000 may be imbricatedly stacked one above the other without such alignment (e.g., such that each node resides at the center of mass of a system formed by its closest four (4) neighbor nodes, in the adjacent layer). For example, FIG. 7 illustrates a situation in which the elastic support nodules (e.g., elastic support nodules 106) of one electrostatic actuation layer are not aligned (e.g., are completely unaligned) with the elastic support nodules of another (e.g., adjacent) electrostatic actuation layer. Likewise, if present, the wells (e.g., wells 208) of one electrostatic actuation layer are not aligned with the wells of another (e.g., adjacent) electrostatic actuation layer.

Generally speaking, electrostatic actuators with imbricatedly stacked electrostatic actuation layers may be less vulnerable to overall bending under the aggregated (e.g., compounded) forces, deformations, or both in the stacked electrostatic actuation layers. This may provide the benefit of maximizing the amplitude of compression in situations where there is some layer bending in the inter-node space. This may also provide the benefit of an overall structure in which the stack of electrostatic actuation layers compresses approximately uniformly, despite localized bending occurring in one or more individual layers within the overall structure. "Bending" in this context refers to a process by which one or more of the electrostatic actuation layers become curved, such that interstitial regions between the elastic support nodules (e.g., elastic support nodules 106 or 206) experience more compression than regions near or at the elastic support nodules.

In certain example embodiments, the electrostatic actuator 1000 (e.g., electrostatic actuator structure) includes a grid of relatively rigid tile structures and relatively malleable areas between the tile structures. This may provide the benefit of allowing the bending of the actuator surface (e.g., uppermost or exterior substrate) at the relatively malleable areas, while retaining local rigidity at or near the relatively rigid tile structures. The relatively rigid tile structures may facilitate compression while providing resistance to bending between the elastic support nodules when the voltage difference is applied to the first and second electrodes of the electrostatic actuation layers.

In various example embodiments, instead of elastic support nodules (e.g., elastic support nodules 106), the electrostatic actuator 1000 (e.g., electrostatic actuator structure) may include rigid supports (e.g., non-elastic support nodules), elastic layer materials, foam-filled structures, continuous supports, continuous limiting structures, web structures, bulging supports (e.g., attached to a top layer) or any suitable combination thereof. According to some example embodiments, one or more elastic support nodules may be replaced by sealed (e.g., hermetically sealed or non-hermetically sealed), gas-filled (e.g., air-filled) cells that function as springs when compressed. According to certain example embodiments, one or more elastic support nodules may be replaced by solid semi-foam, again to function as a spring between the first and second electrodes. As used herein, "solid semi-foam" refers to a solid foam in which air pockets (e.g., air bubbles) are not completely sealed, but rather are polymerized, resulting in holes in the solid walls between the air pockets. According to various example embodiments, the electrostatic actuator 1000 includes a three-dimensional (3D) printed or moulded grid made from one or more suitable polymers that function as springs when compressed. According to some example embodiments, one or more elastic support nodules may be replaced by constrained magnets arranged in repulsion (e.g., with similar poles facing each other) to function as springs (e.g., with higher spring constant values).

In FIGS. 12A, 12B, and 12C, the electrostatic actuator 1000 may include an additional grid array of limiting nodules, which may be arranged between the elastic surface layer and the firm structure, for facilitating the entrance of air between both layers in the expansion process from the configuration shown in FIG. 12C, through the configuration shown in FIG. 12B, to the configuration shown in FIG. 12A.

According to some example embodiments, the grid array of elastic support nodules is in direct contact with both the top and bottom insulated conductive electrode layers, without any additional layer of electrically insulating elastomer material. In certain example embodiments, the grid array of elastic support nodules forms part of the intrinsic structure of a bottom grid of elastomer material, located between the nodules and the bottom insulated conductive electrode layer. According to various example embodiments, the grid array of elastic support nodules is adhered to both top and bottom layers of electrically insulating elastomer material, or forms part of the intrinsic structure of both top and bottom layers of electrically insulating elastomer material.

Figure 13:
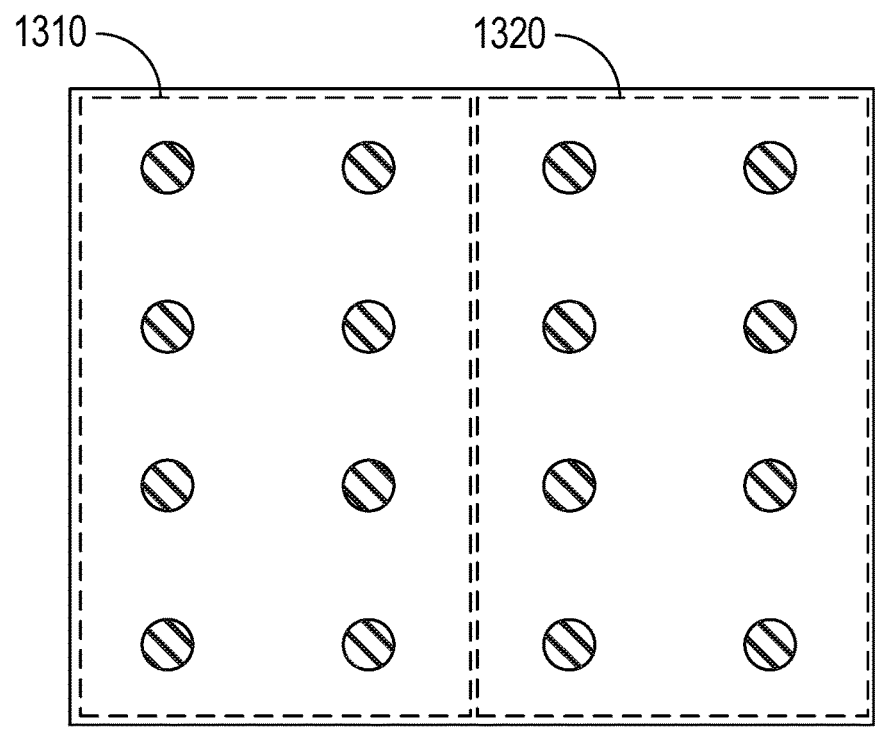
FIG. 13 is a plan view diagram illustrating a multitude of elastic support nodules, arranged in a spaced two-dimensional row-column grid array, with a first zone in which first and second electrodes are present, and with a second zone in which first and second electrodes are absent, according to some example embodiments.
Figure 14:
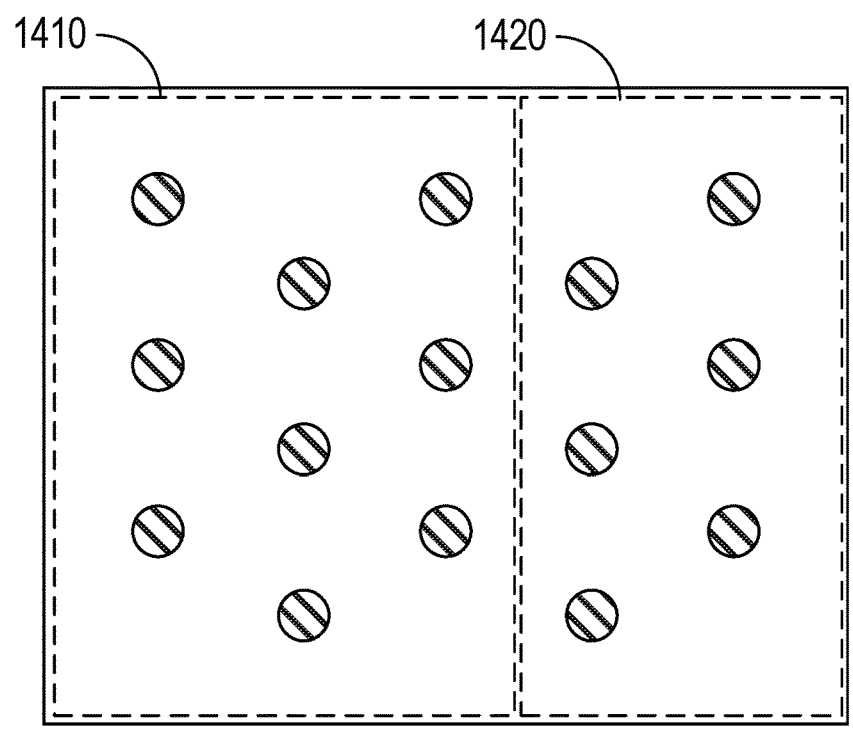
FIG. 14 is a plan view diagram illustrating a multitude of elastic support nodules, arranged in a spaced triangular grid array, with a first zone in which first and second electrodes are present, and with the second zone in which first and second electrodes are absent, according to some example embodiments.

As shown in FIG. 13 and FIG. 14, the electrostatic actuator 1000 may include non-uniform electrodes (e.g., a first or second electrode that does is not coextensive with the entire multitude of elastic support nodules). In FIG. 13, the elastic support nodules in a first zone 1310 are arranged between a first electrode (e.g., first conductive layer 103) and a second electrode (e.g., second conductive layer 104), and the first and second electrodes are present within the first zone 1310. However, in FIG. 13, the elastic support nodules in a second zone 1320 are not arranged between any electrodes, and the first and second electrodes do not extend into the second zone 1320.

Accordingly, while the multitude of elastic support nodules may be uniform and homogeneous (e.g., arranged in a grid array), the electrostatic actuator 1000 can produce one or more non-uniform pressure patterns that result in three-dimensional formations (e.g., one or more ridges) on the surface of the electrostatic actuator 1000. This is facilitated by the elastic surface material of the electrostatic actuator 1000, fluid material flowing from the first zone 1310 to the second zone 1320, or both, within the compression space. For example, such fluid flow may be resultant from the electrostatic pressure being lower in the second zone 1320 where electrodes are absent, compared to the first zone 1310 where electrodes are present.

Similarly, in FIG. 14, the elastic support nodules in a first zone 1410 are arranged between a first electrode (e.g., first conductive layer 103) and a second electrode (e.g., second conductive layer 104), and the first and second electrodes are present within the first zone 1410. However, in FIG. 14, the elastic support nodules in a second zone 1420 are not arranged between any electrodes, and the first and second electrodes do not extend into the second zone 1420. As noted above, while the multitude of elastic support nodules may be uniform and homogeneous (e.g., arranged in a triangular array), the electrostatic actuator 1000 can produce one or more non-uniform pressure patterns that result in three-dimensional formations (e.g., one or more ridges) on the surface of the electrostatic actuator 1000. This is facilitated by the elastic surface material of the electrostatic actuator 1000, fluid material flowing from the first zone 1410 to the second zone 1420, or both, within the compression space. For example, such fluid flow may be resultant from the electrostatic pressure being lower in the second zone 1420 where electrodes are absent, compared to the first zone 1410 where electrodes are present.

As a result, the non-uniform electrodes may cause the surface of the electrostatic actuator 1000 to produce a three-dimensional mechanical oscillation pattern (e.g., a pattern of one or more three-dimensional ridges, bulges, depressions, or any suitable combination thereof). For example, fluid flow from a first zone (e.g., first zone 1310 or 1410) to a second zone (e.g., second zone 1320 or 1420) may cause the second zone to bulge as the first zone compresses, and such bulging may contribute to the production of the three-dimensional mechanical oscillation pattern.

In some example embodiments, a bulging second zone pushes on a rigid surface layer that is mechanically coupled to the elastic surface layer and causes the rigid surface layer to move away from the remainder of the electrostatic actuator 1000. For example, if the second substrate 102 is mechanically coupled to the rigid surface layer within the second zone 1320, the bulging of the second zone 1320 pushes the rigid surface layer away from the first substrate 101, at least within the second zone 1320. Similarly, if the second substrate 202 is mechanically coupled to the rigid surface layer within the second zone 1420, the bulging of the second zone 1420 pushes the rigid surface layer away from the first substrate 201, at least within the second zone 1420.

Throughout this specification, plural instances may implement components, operations, or structures described as a single instance. Although individual operations of one or more methods may be illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of systems (e.g., machines, devices, actuators, or other apparatus) discussed herein.

A first example embodiment provides an electrostatic actuator structure comprising at least a first electrode and a second electrode, said electrostatic actuator structure also comprising one or more electrostatic actuation layers, at least one of said electrostatic actuation layers comprising:

a first substrate film, which is intrinsically conductive or semi conductive, or comprises a first conductive electrode layer said first conductive electrode layer being a part of the first electrode, and a second substrate film with a second conductive electrode layer said second conductive electrode layer being a part of the second electrode, at least one of said first and second conductive electrode layers being insulated from said respective first and second substrate film, and a multitude of elastic support nodules arranged in a grid array, said multitude of elastic support nodules arranged between said first substrate film and said second substrate film, so that there is arranged a compression space between said first and second conductive electrode layers, said compression space not entirely filled with solid material;

said electrostatic actuator structure being arranged to compress when a sufficient voltage difference is applied between said at least a first electrode and a second electrode. Furthermore, the electrostatic actuator structure may be arranged to be expanded by the elastic nodules (e.g., by one or more forces resulting therefrom), back to its original shape, in the absence of this voltage difference.

A second example embodiment provides an electrostatic actuator structure according to the first example embodiment, wherein said electrostatic actuator structure is embedded as part of a flexible substrate.

A third example embodiment provides an electrostatic actuator structure according to the first example embodiment or the second example embodiment, wherein a distance between said first conductive electrode layer and said second conductive electrode layer in said one or more electrostatic actuation layers is less than 1000 micrometers (1000 μm) (e.g., less than 200 micrometers (200 μm)).

A fourth example embodiment provides electrostatic actuator structure according to the any of the first through third example embodiments, wherein a distance between said first conductive electrode layer and said second conductive electrode layer in said one or more electrostatic actuation layers is more than 10 micrometers (10 μm).

A fifth example embodiment provides an electrostatic actuator structure according to any of the first through fourth example embodiments, wherein wells are provided to said second substrate film, said wells being arranged to match the multitude of elastic support nodules of said first substrate film.

A sixth example embodiment provides an electrostatic actuator structure according to any of the first through fifth example embodiments, wherein adjacent support nodules of said multitude of elastic support nodules are arranged less than 10 mm distance apart from each other (e.g., less than 2 mm distance apart from each other).

A seventh example embodiment provides an electrostatic actuator structure according to any of the first through sixth example embodiments, wherein at least one of said electrostatic actuation layers also comprises a grid array comprising a multitude of limiting nodules, said multitude of limiting nodules being arranged between elastic support nodules and between said first substrate film and said second substrate film, for limiting the compression of said electrostatic actuator structure.

A eighth example embodiment provides an electrostatic actuator structure according to any of the first through seventh example embodiments, wherein said compression space is at least partially filled with fluid (e.g. air, nitrogen, or a dielectric liquid, such as dielectric hydraulic fluid).

A ninth example embodiment provides an electrostatic actuator structure according to any of the first through eighth example embodiments, wherein said multitude of elastic support nodules are made of a silicon-based organic polymer (e.g., PDMS). In some further example embodiments similar to the ninth example embodiment, the silicon-based organic polymer is replaced by any suitable rubbery material.

A tenth example embodiment provides an electrostatic actuator structure according to any of the first through ninth example embodiments, wherein said multitude of elastic support nodules have a height (e.g., nodule height) to maximum width aspect ratio with a maximum value of two (2).

An eleventh example embodiment provides an electrostatic actuator structure according to any of the first through tenth example embodiments, wherein surfaces of said first and second conductive electrode layers on both sides of a space gap of said compression space and said elastic support nodules are inherently hydrophobic or are hydrophobically or superhydrophobically coated or hydrophobically or superhydrophobically treated.

A twelfth example embodiment provides an electrostatic actuator structure according to the sixth example embodiment, wherein surfaces of said first and second conductive electrode layers on both sides of a space gap of said compression space, said elastic support nodules, and said limiting nodules are inherently hydrophobic or are hydrophobically or superhydrophobically coated or hydrophobically or superhydrophobically treated.

A thirteenth example embodiment provides an electrostatic actuator structure according to any of the first through twelfth example embodiments, wherein said one or more electrostatic actuation layers of said electrostatic actuator structure comprise several electrostatic actuation layers stacked one above the other so that similar structural elements of said several electrostatic actuation layers coincide at least partially.

A fourteenth example embodiment provides an electrostatic actuator structure according to any of the first through twelfth example embodiments, wherein said one or more electrostatic actuation layers of said electrostatic actuator structure comprise several electrostatic actuation layers imbricatedly stacked one above the other.

A fifteenth example embodiment provides an electrostatic actuator structure according to any of the first through fourteenth example embodiments, wherein said electrostatic actuator structure comprises a grid of more rigid tile structures and more malleable (e.g., less rigid) structures.

A sixteenth example embodiment provides an electrostatic actuator structure according to any of the first through fifteenth example embodiments, wherein said electrostatic actuator structure is hermetically sealed.

A seventeenth example embodiment provides an electrostatic actuator structure according to any of the first through sixteenth example embodiments, wherein said electrostatic actuator structure comprises gas reservoirs (e.g., air reservoirs) allowing decreased overall air compression when air compresses or moves from a compressing layer.

An eighteenth example embodiment provides an electrostatic actuator structure according to any of the first through seventeenth example embodiments, wherein said one or more electrostatic actuation layers are stacked one above another as a stack of electrostatic actuation layers so that in the middle of said stack a bifunctional substrate film or a bifunctional electrically insulating elastomer material layer forms a first substrate film or a second substrate film for two of said electrostatic actuation layers.

A nineteenth example embodiment provides an electrostatic actuator structure according to the eighteenth example embodiment, wherein the substrate films in said stack of electrostatic actuation layers comprise an embedded connection element (e.g., an embedded metal wire), said embedded connection element connecting the conductive electrode layers of said substrate film together, to a high voltage driver, or both.

A twentieth example embodiment provides an electrostatic actuator structure according to the seventeenth example embodiment or the eighteenth example embodiment, wherein in the middle of said stack a bifunctional conductive electrode layer of said bifunctional substrate film is arranged to act as a conductive electrode layer for a two of said electrostatic actuation layers.

A twenty-first example embodiment provides an electrostatic actuator structure according to the sixteenth example embodiment, wherein said electrostatic actuator structure has at least two stacks of electrostatic actuation layers, at least one gas reservoir, and an elastic surface layer arranged on top of said at least two stacks of electrostatic actuation layers and on top of said at least one gas reservoir.

A twenty-second embodiment provides an electrostatic actuator structure according to the twenty-first embodiment, wherein said electrostatic actuator structure has an additional firm structure on top of said elastic surface layer.

A twenty-third example embodiment provides an electrostatic actuator structure according to any of the first through twenty-second example embodiments, wherein said electrostatic actuator structure has a flexible upper substrate.

What is claimed is:

1. An actuator comprising:
a first substrate having a first conductive surface;
a second substrate having a second conductive surface, the first and second conductive surfaces facing toward each other across a compression space between the first and second substrates; and
a plurality of elastic nodules, at least partially matched to a plurality of wells arranged in the second substrate, spanning the compression space and separating the first and second conductive surfaces by electrically insulating from at least one of the first and second conductive surfaces, the compression space being less than fully filled with solid material and configured to be compressed by relative movement of the first and second conductive surfaces toward each other in response to a voltage difference between the first and second conductive surfaces.

2. The actuator of claim 1, wherein:
the first substrate, the second substrate, and the plurality of elastic nodules are included in a flexible substrate.

3. The actuator claim 1, wherein:
at least one of the first conductive surface or the second conductive surface is electrically insulated from the plurality of elastic nodules.

4. The actuator of claim 1, wherein:
the first and second conductive surfaces are both electrically insulated from the plurality of elastic nodules.

5. The actuator of claim 1, wherein:
the first and second conductive surfaces are less than 1000 micrometers (1000 µm) apart.

6. The actuator of claim 1, wherein:
the first and second conductive surfaces are more than 10 micrometers (10 µm) apart.

7. The actuator of claim 1, wherein:
the second substrate includes a plurality of wells arranged to at least partially enclose the plurality of elastic nodules that span the compression space and separate the first and second conductive surfaces.

8. The actuator of claim 1, wherein:
the plurality of elastic nodules include adjacent elastic nodules arranged less than 10 millimeters (10 mm) apart from each other.

9. The actuator of claim 1, further comprising:
a plurality of limiting nodules in the compression space and among the plurality of elastic nodules, the plurality of limiting nodules being configured to limit compression of the compression space.

10. The actuator of claim 9, wherein:
the first and second conductive surfaces and the plurality of elastic limiting nodules are at least partially hydrophobic.

11. The actuator of claim 1, wherein:
the compression space is at least partially filled with fluid configured to flow in response to compression of the compression space.

12. The actuator of claim 1, wherein:
the plurality of elastic nodules are at least partially made of a silicon-based organic polymer.

13. The actuator of claim 1, wherein:
the plurality of elastic nodules have an aspect ratio with a maximum value of two (2), the aspect ratio being a quotient of height to maximum width.

14. The actuator of claim 1, wherein:
at least a portion of the first substrate, at least a portion of the second substrate, and the plurality of elastic nodules are included in a first electrostatic actuation layer of the actuator, the plurality of elastic nodules being a first plurality of elastic nodules; and
the actuator further comprises:
at least one second electrostatic actuation layer stacked on the first electrostatic actuation layer and including a second plurality of elastic nodules at least partially aligned over the first plurality of elastic nodules in the first electrostatic actuation layer.

15. The actuator of claim 1, wherein:
at least a portion of the first substrate, at least a portion of the second substrate, and the plurality of elastic nodules are included in a first electrostatic actuation layer of the actuator, the plurality of elastic nodules being a first plurality of elastic nodules; and
the actuator further comprises:
at least one second electrostatic actuation layer imbricated upon the first electrostatic actuation layer and including a second plurality of elastic nodules non-aligned with the first plurality of elastic nodules in the first electrostatic actuation layer.

16. The actuator of claim 1, further comprising:
a grid of tile structures separated by areas that are more malleable than the tile structures.

17. The actuator of claim 1, wherein:
the first substrate, the second substrate, and the plurality of elastic nodules are included in a hermetically sealed structure.

18. The actuator of claim 1, wherein:
the compression space between the first and second conductive substrates is in fluid communication with a fluid reservoir configured to receive fluid in response to the compression space being compressed.

19. The actuator of claim 1, wherein:
the first substrate is a bifunctional substrate;
the plurality of elastic nodules and a portion of the bifunctional substrate are included in a first electrostatic actuation layer of the actuator; and
the actuator further comprises:
a second electrostatic actuation layer adjacent to the first electrostatic actuation layer, the second electrostatic actuation layer including a remainder of the bifunctional substrate and a further plurality of elastic nodules.

20. The actuator of claim 19, wherein:
the bifunctional substrate includes a layer of electrically insulating material.

21. The actuator of claim 19, wherein:
the bifunctional substrate is conductive and configured to provide both the first conductive surface in the first electrostatic actuation layer and a further conductive surface in the second electrostatic actuation layer that is adjacent to the first electrostatic actuation layer.

22. The actuator of claim 19, wherein:
the bifunctional substrate includes a mesh of elastomer material.

23. The actuator of claim 1, wherein:
the compression space includes a first zone in which the first and second conductive surfaces are present and includes a second zone in which the first and second conductive surfaces are absent, the relative movement of the first and second conductive surfaces toward each other compressing the first zone but not the second zone.

24. The actuator of claim 23, wherein:
the compressing of the first zone but not the second zone causes an external surface of the actuator to form a pattern of one or more three-dimensional ridges.

25. The actuator of claim 23, wherein:
the compressing of the first zone but not the second zone causes the second zone to bulge in response to the compressing of the first zone.

26. The actuator of claim 23, wherein:
the compressing of the first zone causes bulging of the second zone;
the actuator further comprises a rigid surface layer mechanically coupled to the first substrate within the second zone; and
the bulging of the second zone causes the rigid surface layer to move away from the second substrate within the second zone.

27. The actuator of claim 1, further comprising:
a high voltage driver electrically coupled to the first and second conductive surfaces and configured to cause the relative movement of the first and second conductive surfaces toward each other by applying the voltage difference between the first and second conductive surfaces.

28. The actuator of claim 1, further comprising:
a fluid reservoir in fluid communication with compression spaces in the stack of electrostatic actuation layers, the fluid reservoir being configured to receive fluid in response to the compression spaces being compressed; and
an elastic surface layer mechanically coupled to the fluid reservoir and configured to bulge in response to reception of the fluid by the fluid reservoir in response to the compression spaces being compressed.

29. The actuator of claim 28, further comprising:
a rigid surface layer mechanically coupled to the elastic surface layer and configured to move in response to bulging of the elastic surface layer.

30. The actuator of claim 1, further comprising:
a flexible exterior substrate mechanically coupled to the second substrate.

31. The actuator of claim 1, wherein:
the first and second conductive surfaces are less than 200 micrometers (200 μm) apart.

32. The actuator of claim 1, wherein:
the plurality of elastic nodules include adjacent elastic nodules arranged less than 2 millimeters (2 mm) apart from each other.

* * * * *